(12) United States Patent
Urzhumov

(10) Patent No.: US 10,359,513 B2
(45) Date of Patent: Jul. 23, 2019

(54) DYNAMIC-METAMATERIAL CODED-APERTURE IMAGING

(71) Applicant: Elwha LLC, Bellevue, WA (US)

(72) Inventor: Yaroslav A. Urzhumov, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 236 days.

(21) Appl. No.: 15/586,157

(22) Filed: May 3, 2017

(65) Prior Publication Data

US 2018/0321375 A1 Nov. 8, 2018

(51) Int. Cl.
| | |
|---|---|
| *H01Q 3/22* | (2006.01) |
| *G01S 13/88* | (2006.01) |
| *G01S 13/89* | (2006.01) |
| *H01Q 15/00* | (2006.01) |
| *G01S 7/28* | (2006.01) |

(52) U.S. Cl.
CPC ............ *G01S 13/89* (2013.01); *G01S 13/887* (2013.01); *H01Q 3/22* (2013.01); *H01Q 15/0066* (2013.01); *H01Q 15/0086* (2013.01); *G01S 7/2813* (2013.01)

(58) Field of Classification Search
CPC ...... G01S 13/89; G01S 13/887; G01S 7/2813; H01Q 15/0086; H01Q 3/22; H01Q 15/0066
USPC .......................................................... 342/179
See application file for complete search history.

(56) References Cited

U.S. PATENT DOCUMENTS

| | | | |
|---|---|---|---|
| 4,072,949 A | 2/1978 | Brunt | |
| 4,866,448 A | 9/1989 | Rocca et al. | |
| 5,005,418 A * | 4/1991 | Anderson | G01S 7/6245 73/625 |
| 5,079,735 A | 1/1992 | Apostolos | |
| 5,920,285 A * | 7/1999 | Benjamin | H01Q 21/08 342/22 |

(Continued)

FOREIGN PATENT DOCUMENTS

| | | |
|---|---|---|
| WO | 2010021736 A2 | 2/2010 |
| WO | 2011114746 A1 | 9/2011 |
| WO | 2012050614 A1 | 4/2012 |

OTHER PUBLICATIONS

J. Hunt et al., Metamaterial Apertures for Computational Imaging, Science, Jan. 18, 2013, vol. 339, 5 pages.

(Continued)

*Primary Examiner* — Frank J McGue

(57) ABSTRACT

A coded aperture sensing system includes a tunable coding aperture positioned relative to one or more electromagnetic (EM) detectors and voxels to scatter EM radiation traveling from the voxels towards the EM detectors. The system also includes a controller configured to determine EM fields at each of the voxels. A method includes determining a desired aggregate coding matrix of the tunable coding aperture, determining control parameters corresponding to the desired aggregate coding matrix, applying sequentially each of the control parameters to tunable inputs of the tunable coding aperture, and determining the EM fields at each of the voxels. Determining the EM fields includes determining the EM fields at least in part as a function of EM fields detected at the EM detectors responsive to each of the controls being applied to the tunable inputs of the tunable coding aperture.

42 Claims, 3 Drawing Sheets

(56) References Cited

U.S. PATENT DOCUMENTS

| | | | |
|---|---|---|---|
| 5,930,314 A * | 7/1999 | Lanza | G01N 23/204 250/358.1 |
| 5,943,006 A | 8/1999 | Crane et al. | |
| 6,876,337 B2 | 4/2005 | Larry | |
| 7,280,068 B2 | 10/2007 | Lee et al. | |
| 7,646,924 B2 | 1/2010 | Donoho | |
| 7,688,068 B2 | 3/2010 | Beatty | |
| 7,928,893 B2 | 4/2011 | Baraniuk et al. | |
| 7,944,392 B2 | 5/2011 | Falk | |
| 8,014,616 B2 | 9/2011 | Chakraborty et al. | |
| 8,681,047 B2 | 3/2014 | Egri et al. | |
| 2002/0130804 A1* | 9/2002 | McMakin | G01S 7/20 342/22 |
| 2008/0054899 A1 | 3/2008 | Aksoy et al. | |
| 2009/0146895 A1 | 6/2009 | Drexler et al. | |
| 2009/0284431 A1 | 11/2009 | Meharry et al. | |
| 2010/0177164 A1 | 7/2010 | Zalevsky et al. | |
| 2011/0086598 A1 | 4/2011 | Ali et al. | |
| 2011/0123192 A1 | 5/2011 | Rosenthal et al. | |
| 2011/0187577 A1 | 8/2011 | Fuller et al. | |
| 2011/0241934 A1 | 10/2011 | Sarkis | |
| 2011/0267221 A1 | 11/2011 | Brundick et al. | |
| 2011/0273320 A1 | 11/2011 | Nogueira-Nine | |
| 2012/0019892 A1 | 1/2012 | Bowers et al. | |
| 2012/0194399 A1 | 8/2012 | Bily et al. | |
| 2013/0335256 A1* | 12/2013 | Smith | G01S 13/887 342/22 |
| 2014/0128032 A1 | 5/2014 | Muthukumar | |
| 2017/0063344 A1 | 3/2017 | Broyde et al. | |
| 2017/0163327 A1 | 6/2017 | Yang et al. | |

OTHER PUBLICATIONS

C. Watts et al., Terahertz Compressive Imaging With Metamaterial Spatial Light Modulators, Nature Photonics, 29 Jun. 29, 2014, pp. 605-609.
D. Shrekenhamer et al., Terahertz Single Pixel Imaging With an Optically Controlled Dynamic Spatial Light Modulator, Optics Express, May 20, 2013, vol. 21, 12 pages.
Juan Domingo Baena, Jordi Bonache, Ferran Martin, Ricardo Marqués Sillero, Francisco Falcone, Txema Lopetegi, Miguel A. G. Laso, Joan García-García, Ignacio Gil, Maria Flores Portillo, and Mario Sorolla, Equivalent-Circuit Models for Split-Ring Resonators and Complementary Split-Ring Resonators Coupled to Planar Transmission Lines, IEEE Transactions on Microwave Theory and Techniques, vol. 53, No. 4, Apr. 2005, 11 pages.
José M. Bioucas-Dias, and Mario A. T. Figueiredo, A New TwIST: Two-Step Iterative Shrinkage/Thresholding Algorithms for Image Restoration, EEE Transactions on Image Processing, vol. 16, No. 12, Dec. 2007, 13 pages.
David J. Brady, Kerkil Choi, Daniel L. Marks, Ryoichi Horisaki and Sehoon Lim, Compressive Holography, Department of Electrical and Computer Engineering and The Fitzpatrick Institute for Photonics, Duke University, Durham, NC, Jul. 20, 2009 / vol. 17, No. 15 / Optics Express, 10 pages.
Christophe Caloz and Tatsuo Itoh, Electromagnetic Metamaterials: Transmission Line Theory and Microwave Applications, Chapter 6, Radiated-Wave Applications, 2006 John Wiley & Sons, Inc., 56 pages.
Emmanuel J. Candes, The Restricted Isometry Property and Its Implications for Compressed Sensing, Applied & Computational Mathematics, California Institute of Technology, Pasadena, CA, 4 pages.
Emmanuel J. Candes,Compressive sampling, Applied and Computational Mathematics, California Institute of Technology, Pasadena,CA, 2000, 20 pages.
Wai Lam Chan, Hou-Tong Chen, Antoinette J. Taylor, Igal Brener, Michael J. Cich et al., A spatial light modulator for terahertz beams, American Institute of Physics, 2009, 4 pages.
Wai Lam Chan, Hou-Tong Chen, Antoinette J. Taylor, Igal Brener, Michael Cich, and Daniel M. Mittleman, A Spatial Light Modulator for Terahertz Radiation, Rice University, Dept of Elec. and Computer Engineering Houston, TX, Center for Integrated Nanotechnologies, Los Alamos, NM, Center for Integrated Nanotechnologies Albuquerque, NM, 2009, 2 pages.
Wai Lam Chan, Kriti Charan, Dharmpal Takhar, Kevin F. Kelly, Richard G. Baraniuk et al., A single-pixel terahertz imaging system based on compressed sensing, American Institute of Physics, 2008, 4 pages.
Hou-Tong Chen, Willie J. Padilla, Joshua M. O. Zide, Arthur C. Gossard, Antoinette J. Taylor, and Richard D. Averitt, Active terahertz metamaterial devices, Nature, vol. 444,Nov. 30, 2006, 4 pages.
Christy Fernandez Cull,David A. Wikner, Joseph N. Mait, Michael Mattheiss, and David J. Brady, Millimeter-wave compressive holography, Applied Optics / vol. 49, No. 19 / Jul. 1, 2010, 16 pages.
David L. Donoho,Compressed Sensing, IEEE Transactions on Information Theory, vol. 52, No. 4, Apr. 2006, pp. 1289-1306.
T. Driscoll, D. N. Basov, P.M. Rye, S Nemat-Nasser, D. Schuring and D.R. Smith, Free-space microwave focusing by a negative-index gradient lens, Applied Physics Letters 88, 081101, 2006, pages.
John Hunt, Jonah Gollub, Tom Driscoll, Guy Lipworth, Alex Mrozack, Matthew S. Reynolds, David J. Brady, and David R. Smith, Metamaterial microwave holographic imaging system, vol. 31, Oct. 10, 2014, J.Opt. Soc. Am. A, p. 2109.
Takaoki Ikeda, Kunio Sakakibara, Toru Matsui, Nobuyoshi Kikuma, and Hiroshi Hirayama, Beam-scanning Performance of Leaky-wave Slot Array Antenna on Variable Stub-loaded Left-handed Waveguide, Nagoya Institute of Technology, Japan, 2007, 4 pages.
Zubin Jacob, Leonid V. Alekseyev and Evgenii Narimanov, Optical Hyperlens: Far-field imaging beyond the diffraction limit, Sep. 4, 2006 / vol. 14, No. 18 / Optics Express, 10 pages.
Nathan Kundtz and David R. Smith, Extreme-angle broadband metamaterial lens, Nature Materials, Letters, Dec. 20, 2009, 4 pages.
Ruopeng Liu, Xin Mi Yang, Jonah G. Gollub, Jack J. Mock, Tie Jun Cie et al., Gradient index circuit by waveguided metamaterials, American Institute of Physics, 2009, 4 pages.
S.T. Chiw, P. Gardner and S.C. Gao, Electronics Letters, Nov. 7, 2002, vol. 38, No. 23, pp. 1414-1416.
Abhijit Mahalanobis, Mark Neifeld, Vijaya Kumar Bhagavatula, Thomas Haberfelde, and David Brady, Off-axis sparse aperture imaging using phase optimization techniques for application in wide-area imaging systems, Applied Optics / vol. 48, No. 28 / Oct. 1, 2009, pp. 5212-5224.
T. Driscoll et al., Memory Metamaterials, Science, vol. 325, Sep. 18, 2009, pp. 1518-1521.
Evgenii Narimanov, Metamaterials to beat the static, 2008 Nature Publishing Group, pp. 273-274.
Hoang V. Nguyen, S. Abielmona, A. Rennings and C. Caloz, Pencil-Beam Full-Space Scanning 2D CRLH Leaky-Wave Antenna Array, 2007 IEEE, pp. 139-142.
W.J. Padilla, A.J. Taylor, C. Highstrete, Mark Lee and R.D. Avert, Dynamical Electric and Magnetic Metamaterial Response at Terahertz Frequencies, 2006 IEEE, 2 pages.
PCT, IPR, Intl Appln. No. PCT/US2013/040444, Intl Filing Date Sep. 5, 2013, Authorized officer Athina Nickitas-Etienne, WIPO, 37 pages.
PCT, ISR, PCT/US2013/040444, Date of mailing May 21, 2014, Intl filing date May 9, 2013, Applicant: Duke University, Authorized officer Heinz Senkel, EPO, 10 pages.
PCT, IPR, PCT/US2014/060080, Date of mailing Nov. 10, 2013, Intl filing date Oct. 10, 2014, Applicant: Duke University, Authorized officer El Mostafa Moussaid, WIPO, 40 pages.
J.B. Pendry et al., Controlling Electromagnetic Fields, Jun. 23, 2006, vol. 312, Science, pp. 1780-1782.
Lee C. Potter, Emre Ertin, Jason T. Parker, and Mujdat Cetin, Sparsity and Compressed Sensing in Radar Imaging, Proceedings of the IEEE | vol. 98, No. 6, Jun. 2010, pp. 1006-1020.
David Shrekenhamer, Saroj Rout, Andrew C. Strikwerda, Chris Bingham, Richard D. Averitt, Sameer Sonkusale, and Willie J.

(56) References Cited

OTHER PUBLICATIONS

Padilla, High speed terahertz modulation from metamaterials with embedded high electron mobility transistors, May 9, 2011 / vol. 19, No. 10 / Optics Express, pp. 9968-9975.
Dharmpal Takhar, Jason N. Laska, Michael B. Wakin, Marco F. Duarte, Dror Baron, Shriram Sarvotham, Kevin F. Kelly, and Richard G. Baraniuk, A New Compressive Imaging Camera Architecture using Optical-Domain Compression, 2006 Society of Photo-Optical Instrumentation Engineers, 10 pages.
Yaroslav Urzhumov and David R. Smith, Metamaterial-Enhanced Coupling between Magnetic Dipoles for Efficient Wireless Power Transfer, Duke University, N. Carolina, Feb. 16, 2011, 23 pages.
U.S. Appl. No. 14/511,845, filed Oct. 10, 2014, Examiner Initiated Interview Summary dated Jun. 10, 2016, 6 pages.
Rebecca M. Willett, Roummel F. Marcia, and Jonathan M. Nichols, Compressed sensing for practical optical imaging systems: a tutorial, Optical Engineering 50(7), 072601 (Jul. 2011), 14 pages.
Zhimin Xu and Edmund Y.Lam, Image reconstruction using spectroscopic and hyperspectral information for compressive terahertz imaging, J. Opt. Soc. Am. A/ vol. 27, No. 7/ Jul. 2010, pp. 1638-1646.
PCT International Search Report; International App. No. PCT/US2018/083759; dated Jan. 31, 2019; pp. 1-3.

\* cited by examiner

DYNAMIC-METAMATERIAL CODED-APERTURE IMAGING

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

Priority Applications

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

Figure 1:
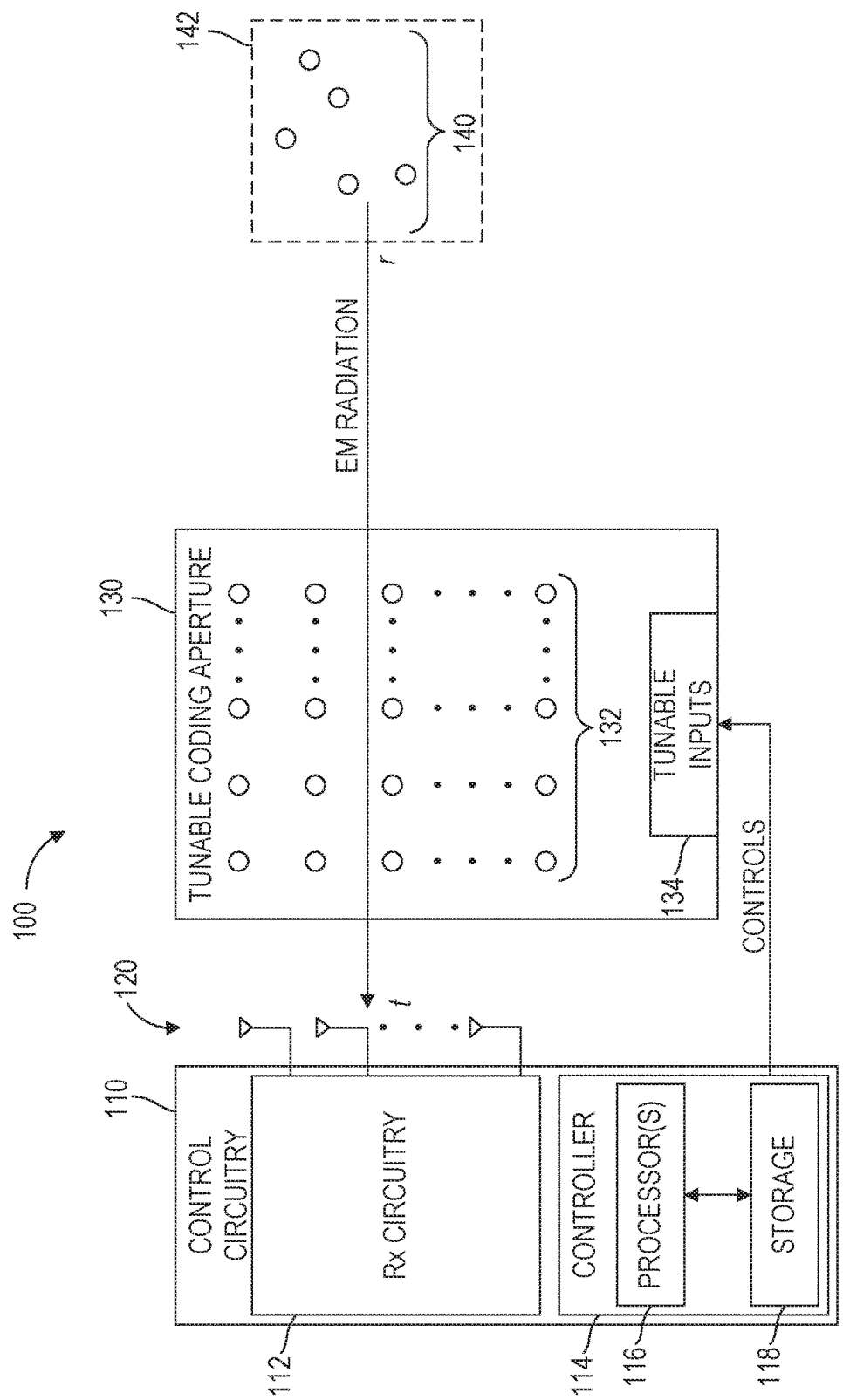
FIG. 1 is a simplified block diagram of a coded aperture sensing system, according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Coded aperture sensing systems and related methods are disclosed herein. The disclosure relates to coherent electromagnetic imaging, with emphasis on radio frequency (RF) imaging in the low-frequency (LF) through millimeter waves (mmWaves) and terahertz (THz) range of the electromagnetic (EM) spectrum. The disclosure describes methods and apparatuses that enhance the performance metrics of coded-aperture imaging, and enable sub-wavelength resolution coded-aperture imaging.

A non-exhaustive list of example embodiments that fall within the scope of the disclosure follows. It is contemplated that these example embodiments and portions thereof are combinable with each other and with other features discussed herein, unless it is explicitly indicated otherwise or it would be apparent to one of ordinary skill in the art that they are not combinable.

For example, in some embodiments a coded aperture sensing system includes one or more electromagnetic (EM) detectors, a tunable coding aperture, and control circuitry. The tunable coding aperture is positioned relative to the one or more EM detectors and a plurality of voxels to scatter EM radiation traveling from the plurality of voxels towards the one or more EM detectors The tunable coding aperture includes EM scattering elements and tunable inputs. The EM scattering elements are spaced at less than or equal to half wavelength intervals. The half wavelength intervals are half of an operational wavelength of the EM detectors. The tunable inputs are operably coupled to the EM scattering elements and configured to adjust a coding matrix of the tunable coding aperture responsive to adjustments of controls applied to the tunable inputs. The control circuitry includes a controller operably coupled to the tunable inputs. The controller is programmed to determine a desired aggregate coding matrix comprising an aggregation of a plurality of different desired coding matrices of the tunable coding aperture. The controller is also programmed to determine a plurality of different control parameter vectors representing a plurality of different permutations of controls to be applied to the tunable inputs of the tunable coding aperture that will cause the coding matrix of the tunable coding aperture to adjust at least approximately to a different one of the plurality of desired coding matrices when applied to the tunable inputs of the tunable coding aperture. The controller is further programmed to apply sequentially each of the plurality of different permutations of controls represented by the plurality of different control parameter vectors to the tunable inputs of the tunable coding aperture. In addition, the controller is programmed to determine EM fields at each of the plurality of voxels at least in part as a function of EM fields detected at the one or more EM detectors responsive to each of the plurality of different permutations of controls being applied to the tunable inputs of the tunable coding aperture.

In some embodiments, a coded aperture sensing system includes a tunable coding aperture positioned relative to one or more EM detectors and a plurality of voxels, wherein the plurality of voxels includes locations in space for which it is desired to infer amplitudes of EM fields.

In some embodiments, a coded aperture sensing system includes a tunable coding aperture positioned relative to one or more EM detectors and a plurality of voxels, wherein the plurality of voxels includes a plurality of pixels including locations in a two-dimensional manifold in space.

In some embodiments, a coded aperture sensing system includes a tunable coding aperture positioned relative to one or more EM detectors and a plurality of voxels, wherein at least a portion of the plurality of voxels includes locations in space on or in one or more objects that it is desired to image.

In some embodiments, a coded aperture sensing system includes control circuitry programmed to determine a desired aggregate coding matrix based, at least in part, on a coding matrix figure of merit of at least a portion of possible aggregate coding matrices of a tunable coding aperture.

In some embodiments, a coded aperture sensing system includes control circuitry programmed to determine a desired aggregate coding matrix based, at least in part, on a coding matrix figure of merit of at least a portion of possible aggregate coding matrices of a tunable coding aperture, wherein the coding-matrix figure of merit includes an effective rank, the effective rank defined as a number of singular values of a matrix that exceed a predetermined threshold, wherein the desired aggregate coding matrix comprises one of the portion of possible aggregate coding matrices that has a highest effective rank.

In some embodiments, a coded aperture sensing system includes control circuitry programmed to determine a desired aggregate coding matrix based, at least in part, on a coding matrix figure of merit of at least a portion of possible aggregate coding matrices of a tunable coding aperture, wherein the coding-matrix figure of merit includes a generalized determinant, the generalized determinant defined as a product of singular values of a matrix, wherein desired aggregate coding matrix comprising one of the portion of possible aggregate coding matrices that has a highest generalized determinant.

In some embodiments, a coded aperture sensing system includes control circuitry programmed to determine a desired aggregate coding matrix based, at least in part, on a coding matrix figure of merit of at least a portion of possible aggregate coding matrices of a tunable coding aperture, wherein the coding-matrix figure of merit includes a minimum singular value, wherein the control circuitry is programmed to determine the desired aggregate coding matrix by selecting the desired aggregate coding matrix to be a matrix having a highest minimum singular value from among the at least a portion of possible aggregate coding matrices of the tunable coding aperture.

In some embodiments, a coded aperture sensing system includes control circuitry programmed to determine a desired aggregate coding matrix based, at least in part, on a coding matrix figure of merit of at least a portion of possible aggregate coding matrices of a tunable coding aperture, wherein the coding-matrix figure of merit includes a condition number, wherein the control circuitry is programmed to determine the desired aggregate coding matrix by selecting the desired aggregate coding matrix to be a matrix having a lowest condition number from among the at least a portion of possible aggregate coding matrices of the tunable coding aperture.

In some embodiments, a coded aperture sensing system includes control circuitry programmed to determine a desired aggregate coding matrix including at least a portion of possible aggregate coding matrices of a tunable coding aperture, wherein the at least a portion of possible aggregate coding matrices of the tunable coding aperture includes at least a portion of possible aggregate coding matrices having a number N of aggregated coding matrices each.

In some embodiments, a coded aperture sensing system includes control circuitry programmed to determine a desired aggregate coding matrix including at least a portion of possible aggregate coding matrices of a tunable coding aperture, wherein the at least a portion of possible aggregate coding matrices having a number N of aggregated coding matrices includes all possible aggregate coding matrices of the tunable coded aperture having the number N of aggregated coding matrices.

In some embodiments, a coded aperture sensing system includes control circuitry programmed to determine a desired aggregate coding matrix including at least a portion of possible aggregate coding matrices of a tunable coding aperture, wherein a controller of the control circuitry is programmed to select a number N of aggregated coding matrices to be a lowest integer that is greater than or equal to a number of a plurality of voxels divided by a number of the one or more EM detectors.

In some embodiments, a coded aperture sensing system includes control circuitry programmed to determine a desired aggregate coding matrix including at least a portion of possible aggregate coding matrices of a tunable coding aperture, wherein the at least a portion of possible aggregate coding matrices of the tunable coding aperture includes at least a portion of possible aggregate coding matrices having a number N+1 of aggregated coding matrices if it is determined that a matrix having a highest effective rank from among at least a portion of possible aggregate coding matrices having a number N of aggregated coding matrices is not full rank.

In some embodiments, a coded aperture sensing system includes control circuitry programmed to determine a desired aggregate coding matrix including at least a portion of possible aggregate coding matrices of the tunable coding aperture includes at least a portion of possible aggregate coding matrices having the number N of aggregated coding matrices if it is determined that the matrix having the highest effective rank from among the at least a portion of possible aggregate coding matrices having the number N of aggregated coding matrices is a full rank matrix.

In some embodiments, a coded aperture sensing system includes control circuitry programmed to determine a desired aggregate coding matrix including at least a portion of possible aggregate coding matrices of a tunable coding aperture, wherein the controller is programmed to determine the at least a portion of possible aggregate coding matrices as a function of at least a portion of possible control parameter vectors of the plurality of different control parameter vectors.

In some embodiments, a coded aperture sensing system including a controller programmed to determine at least a portion of possible aggregate coding matrices by modeling a tunable coding aperture to include lumped impedance elements corresponding to the EM scattering elements, tunable inputs of the tunable coding aperture configured to enable selection of an impedance value for each of the lumped impedance elements.

In some embodiments, a coded aperture sensing system includes a controller programmed to determine possible scattering matrices (S-matrices) relating field amplitudes at lumped ports for at least a portion of possible control parameter vectors. The lumped ports include internal lumped ports located internally to a tunable coding aperture. Each of the internal lumped ports corresponds to a different one of lumped impedance elements of the tunable coding aperture. The lumped ports also include external lumped ports located externally to the tunable coding aperture. Each of the external lumped ports corresponds to a different one of the plurality of voxels or the one or more EM detectors. The controller is further programmed to determine at least a portion of possible aggregate coding matrices of the tunable coding aperture using the determined possible S-matrices.

In some embodiments, a coded aperture sensing system includes a controller that is programmed to determine possible S-matrices as functions of an impedance matrix (Z-matrix) and an admittance vector (y-vector), wherein the Z-matrix includes impedance values relating voltage potentials at each of lumped ports to currents at each of the lumped ports with all others of the lumped ports open at an operational frequency of EM detectors, and the y-vector is a diagonal matrix including admittance values of the lumped ports.

In some embodiments, a coded aperture sensing system includes a controller that is programmed to determine possible S-matrices as functions of an admittance matrix (Y-matrix) and an impedance vector (z-vector), wherein the Y-matrix includes admittance values relating voltage potentials at each of lumped ports to currents at each of the lumped ports with all others of the lumped ports open at an operational frequency of EM detectors and the z-vector is a diagonal matrix including impedance values of the lumped ports.

In some embodiments, a coded aperture sensing system includes a number of one or more EM detectors that is exactly one.

In some embodiments, a coded aperture sensing system includes a controller programmed to use a number N of aggregated coding matrices of a desired aggregate coding matrix that is at least a number of one or more EM detectors.

In some embodiments, a method of operating a coded aperture sensing system includes scattering electromagnetic (EM) radiation traveling from a plurality of voxels towards one or more EM detectors with a tunable coding aperture. The tunable coding aperture includes EM scattering elements spaced at less than or equal to half wavelength intervals. The method also includes determining a desired aggregate coding matrix comprising an aggregation of a plurality of different desired coding matrices of the tunable coding aperture. The method further includes determining a plurality of different control parameter vectors representing a plurality of different permutations of controls to be applied to tunable inputs of the tunable coding aperture that will cause the coding matrix of the tunable coding aperture to adjust at least approximately to a different one of the plurality of desired coding matrices when applied to the tunable inputs of the tunable coding aperture. In addition, the method includes applying sequentially each of the plurality of different permutations of controls represented by the plurality of different control parameter vectors to the tunable inputs of the tunable coding aperture. Furthermore, the method includes determining EM fields at each of the plurality of voxels at least in part as a function of EM fields detected at the one or more EM detectors responsive to each of the plurality of different permutations of controls being applied to the tunable inputs of the tunable coding aperture.

In some embodiments, a method includes scattering EM radiation traveling from a plurality of voxels towards one or more EM detectors with a tunable coding aperture, which includes scattering the EM radiation traveling from locations in space for which it is desired to infer amplitudes of the EM fields.

In some embodiments, a method includes scattering EM radiation traveling from a plurality of voxels towards one or more EM detectors with a tunable coding aperture, which includes scattering the EM radiation traveling from locations in a two-dimensional manifold in space.

In some embodiments, a method includes scattering EM radiation traveling from a plurality of voxels towards one or more EM detectors with a tunable coding aperture, which includes scattering the EM radiation traveling from locations in space on or in one or more objects that it is desired to image.

In some embodiments, a method includes determining a desired aggregate coding matrix, which includes determining the desired aggregate coding matrix based, at least in part, on a coding matrix figure of merit of at least a portion of possible aggregate coding matrices of a tunable coding aperture.

In some embodiments, a method includes determining a desired aggregate coding matrix based, at least in part, on a coding matrix figure of merit, which includes determining the desired aggregate coding matrix based, at least in part, on an effective rank of the at least a portion of possible aggregate coding matrices of the tunable coding aperture, the effective rank defined as a number of singular values of a matrix that exceed a predetermined threshold, wherein the desired aggregate coding matrix comprises one of the portion of possible aggregate coding matrices that has a highest effective rank.

In some embodiments, a method includes determining a desired aggregate coding matrix based, at least in part, on a coding matrix figure of merit, which includes determining the desired aggregate coding matrix based, at least in part, on a generalized determinant of at least a portion of possible aggregate coding matrices of the tunable coding aperture, the generalized determinant defined as a product of singular values of a matrix, wherein the desired aggregate coding matrix comprises one of the portion of possible aggregate coding matrices that has a highest generalized determinant.

In some embodiments, a method includes determining a desired aggregate coding matrix based, at least in part, on a coding matrix figure of merit, which includes determining the desired aggregate coding matrix based, at least in part on a minimum singular value of at least a portion of possible aggregate coding matrices of the tunable coding aperture, wherein determining the desired aggregate coding matrix includes selecting the desired aggregate coding matrix to be a matrix having a highest minimum singular value from among the at least a portion of possible aggregate coding matrices of the tunable coding aperture.

In some embodiments, a method includes determining a desired aggregate coding matrix based, at least in part, on a coding matrix figure of merit, which includes determining the desired aggregate coding matrix based, at least in part on a condition number of at least a portion of possible aggregate coding matrices of a tunable coding aperture, wherein determining the desired aggregate coding matrix includes selecting the desired aggregate coding matrix to be a matrix having a lowest condition number from among the at least a portion of possible aggregate coding matrices of the tunable coding aperture.

In some embodiments, a method includes determining a desired aggregate coding matrix, which includes determining the desired aggregate coding matrix of at least a portion of possible aggregate coding matrices of a tunable coding aperture including at least a portion of possible aggregate coding matrices having a number N of aggregated coding matrices each.

In some embodiments, a method includes determining a desired aggregate coding matrix, wherein at least a portion of possible aggregate coding matrices having a number N of aggregated coding matrices includes all possible aggregate coding matrices of a tunable coded aperture having a number N of aggregated coding matrices.

In some embodiments, a method includes selecting a number N of aggregated coding matrices to be a lowest integer that is greater than or equal to a number of a plurality of voxels divided by a number of one or more EM detectors.

In some embodiments, a method includes determining a desired aggregate coding matrix, which includes determining at least a portion of possible aggregate coding matrices of a tunable coding aperture to include at least a portion of possible aggregate coding matrices having a number N+1 of aggregated coding matrices if it is determined that a matrix having a highest effective rank from among at least a portion of possible aggregate coding matrices having a number N of aggregated coding matrices is not full rank.

In some embodiments, a method includes determining at least a portion of possible aggregate coding matrices of a tunable coding aperture to include at least a portion of possible aggregate coding matrices having the number N of aggregated coding matrices if it is determined that a matrix having a highest effective rank from among the at least a portion of possible aggregate coding matrices having the number N of aggregated coding matrices is a full rank matrix.

In some embodiments, a method includes determining a desired aggregate coding matrix, which includes determining at least a portion of possible aggregate coding matrices as a function of at least a portion of possible control parameter vectors of a plurality of different control parameter vectors.

In some embodiments, a method includes determining a desired aggregate coding matrix, which includes modeling a tunable coding aperture to include lumped impedance elements corresponding to EM scattering elements, tunable inputs of the tunable coding aperture configured to enable selection of an impedance value for each of the lumped impedance elements.

In some embodiments, a method includes determining possible scattering matrices (S-matrices) relating field amplitudes at lumped ports for at least a portion of possible control parameter vectors. The lumped ports include internal lumped ports located internally to a tunable coding aperture, each of the internal lumped ports corresponding to a different one of lumped impedance elements of the tunable coding aperture. The lumped ports also include external lumped ports located externally to the tunable coding aperture. Each of the external lumped ports corresponds to a different one of a plurality of voxels or one or more EM detectors. The method also includes determining at least a portion of possible aggregate coding matrices using the determined possible S-matrices.

In some embodiments, a method includes determining possible S-matrices, which includes determining the possible S-matrices as functions of an impedance matrix (Z-matrix) and an admittance vector (y-vector), wherein the Z-matrix includes impedance values relating voltage potentials at each of lumped ports to currents at each of the lumped ports with all others of the lumped ports open at an operational frequency of EM detectors, and the y-vector is a diagonal matrix including admittance values of the lumped ports.

In some embodiments, a method includes determining possible S-matrices, which includes determining the possible S-matrices as functions of an admittance matrix (Y-matrix) and an impedance vector (z-vector), wherein the Y-matrix includes admittance values relating voltage potentials at each of the lumped ports to currents at each of the lumped ports with all others of the lumped ports open at an operational frequency of EM detectors and the z-vector is a diagonal matrix including impedance values of the lumped ports.

In some embodiments, a method includes scattering EM radiation traveling from a plurality of voxels towards one or more EM detectors, which includes scattering the EM radiation towards a number of the one or more EM detectors that is exactly one.

In some embodiments, a method includes determining a desired aggregate coding matrix comprising an aggregation of a plurality of different desired coding matrices of a tunable coding aperture, which includes determining the desired aggregate coding matrix to include a number N of different desired coding matrices that is at least a number of one or more EM detectors.

FIG. 1 is a simplified block diagram of a coded aperture sensing system 100 (sometimes referred to herein as "system" 100), according to some embodiments. The system 100 includes one or more EM detectors 120 (sometimes referred to herein as "EM detectors" 120), a tunable coding aperture 130, control circuitry 110, and voxels 140. The tunable coding aperture 130 is positioned relative to the EM detectors 120 and the voxels 140 to scatter EM radiation traveling from the voxels 140 towards the EM detectors 120. The control circuitry 110 includes Rx circuitry 112 and a controller 114 configured to apply controls to tunable inputs 134 of the tunable coding aperture 130 such that a coding matrix of the tunable coding aperture 130 transitions sequentially through a plurality of different desired coding matrices. The controller 114 is also configured to determine EM fields at the voxels 140 at least in part as a function of EM fields detected at the EM detectors 120 responsive to each of the different controls being applied to the tunable inputs 134. The Rx circuitry 112 is configured to receive and determine the EM fields received by the EM detectors 120.

The controller 114 includes one or more processors 116 (sometimes referred to herein as "processor" 116) operably coupled to one or more data storage devices 118 (sometimes referred to herein as "storage" 118). The processor 116 is configured to execute computer-readable instructions stored on the storage 118. The computer-readable instructions are configured to instruct the processor 116 to perform operations that the controller 114 is configured to perform. In other words, the controller 114, or the control circuitry 110 more generally, is programmed to perform the operations that the controller 114 is configured to perform. By way of non-limiting example, the computer-readable instructions are configured to instruct the processor to perform at least a portion of the method 300 of FIG. 3, the method 400 of FIG. 4, other operations discussed herein, or combinations thereof. The processor 116 may include a device configured to execute computer-readable instructions such as, for example, a central processing unit (CPU), a microcontroller, a programmable logic controller, other programmable device, or combinations thereof. The storage 118 may include a device configured to electronically store data (e.g., computer-readable instructions) such as, for example, volatile data storage (e.g., random access memory (RAM)), non-volatile data storage (e.g., Flash memory, a hard drive, a solid state drive, electrically programmable read-only memory (EPROM)), other data storage, or combinations thereof.

A coded aperture (such as the tunable coding aperture 130) may be used for both coherent and incoherent imaging. In the case of coherent imaging, fields can be characterized by both amplitude and phase. A system (such as the system 100) may include a number $N_i$ of input "voxels" or "pixels" (such as the voxels 140) and a number $N_d$ of EM detectors (such as the EM detectors 120). The number $N_i$ of input voxels may be different from the number $N_d$ of detectors. By way of non-limiting example, the number $N_d$ of EM detectors may be smaller than the number $N_i$ of input voxels.

The EM detectors 120 may each include an antenna or plurality of antennas, or other structure capable of detecting EM radiation. By way of non-limiting example, the detectors 120 may include patch antennas, dipole antennas, monopole antennas, slot antennas, loop antennas, or other antennas known in the art.

As used herein, the term "voxel" refers to a spatial location at which it is desired to determine or infer a complex amplitude of a field for the purpose of subsequent image reconstruction. The term "voxel" encompasses the term "pixel," which may be part of a two-dimensional manifold of voxels. "Voxels," in general, may also include three-dimensional, or even one-dimensional manifolds of voxels. Accordingly, in some embodiments, the voxels 140 may be locations in free space for which it is desired to infer EM filed amplitudes. In some embodiments, the voxels 140 may be located on or in an object 142 that it is desired to image.

As used herein, the terms "coded aperture" and "coding aperture" refer to a linear transmissive body (e.g., a layer, a plate, a volume, etc.) placed between the voxels or pixels and the detectors. A conventional coded aperture includes pixels (for thin plates) or voxels (for volumetric coded apertures) having different amplitudes or phases of transmittance, thus providing modulation of the transmitted fields. More generally, a coded aperture includes a scattering layer having multiple scattering cells (e.g., EM scattering elements). Effects of such a coded aperture may not be reducible to a simple "transmission through a mask" effect.

The effect of the tunable coding aperture 130 on measurements taken by the EM detectors 120 can be described by a linear transformation C between complex-valued amplitudes at the $N_i$ voxels 140 and complex-valued amplitudes detected at the $N_d$ EM detectors 120. This linear transformation C may be expressed mathematically as:

$$t=Cr,$$

where t is a vector of length $N_d$ representing the amplitudes detected at the EM detectors 120, and r is a vector of length $N_i$ representing complex-valued amplitudes at the voxels 140.

The tunable coding aperture 130 includes EM scattering elements 132 spaced at sub-wavelength intervals (e.g., less than or equal to half wavelength intervals, less than or equal to quarter wavelength intervals, etc.). This spacing may be uniform, non-uniform, or a combination thereof. Each of the EM scattering elements 132 includes a variable impedance element controllable by the controls provided by the controller 114 to the tunable inputs 134 of the tunable coding aperture 130. As a result, the tunable coding aperture 130 may include a metamaterial that is controlled by the controller 114.

In some embodiments, it may be desirable to use a relatively small number $N_d$ of EM detectors 120. For example, where the imaging is performed with a single EM detector (i.e., the number $N_d$ of EM detectors 120 is exactly one), the imaging may be referred to as "single-detector imaging." The rationale for using few EM detectors 120 is at least two-fold: (1) EM detectors 120 can be substantially more expensive than the tunable scattering elements 132 of the tunable coding aperture 130 (this is particularly true of millimeter-wave and THz EM detectors); and (2) collecting EM radiation from a large number of voxels 140 covering a wide tunable coding aperture 130 and sending that EM radiation to a fewer number of EM detectors 120 (or even focusing them to just one EM detector 120) can enable higher signal-to-noise ratios at the EM detectors 120. This is analogous to collecting light with a large, multi-wavelength lens and focusing it to a single-wavelength spot.

In some embodiments, $N_d < N_i$. In such embodiments, C is a rectangular matrix that cannot be inverted. As a result, the r vector cannot be estimated reliably from the measured data stored in t. The Estimation of r based on the known t is referred to herein as "image reconstruction problem." The image reconstruction problem is a linear inverse problem. This is not to be confused with any additional image reconstruction that may need to be performed to infer a human-readable picture out of the set of measured "input pixels." This additional image reconstruction can be performed in addition to operations discussed herein. This disclosure, however, focuses on reconstructing the field amplitudes at a selected set of locations, rather than constructing an actual rendering of the scene (e.g., an image).

Accuracy of estimations of r in image reconstruction problems may be described using the condition number of C, as follows:

$$k(C)=\|C^{-1}\|\times\|C\|,$$

where $\|*\|$ is any suitable norm. For most norm choices, this definition amounts to:

$$k(C) = \frac{\sigma_{max}(C)}{\sigma_{min}(C)},$$

where $\sigma_{max}(C)$ and $\sigma_{min}(C)$ are the largest and the smallest singular values of C, respectively. A rank-degenerate C matrix, in particular, has an infinite condition number. Matrices with a condition number close to unity are ideal for the linear image reconstruction problem.

To resolve the insufficient rank issue, coded-aperture imaging takes repeated measurements, each measurement taken with a different coding matrix of the tunable coding aperture 130, which are controlled by the controller 114 applying controls (e.g., control vectors of the controls that control the tunable coding aperture 130 to assume the different coding matrices) to the tunable inputs 134. Each of these different coding matrices results in a different C matrix. As a result, for each instance m of a different measurement and its corresponding coding matrix, the linear transformation relation may be expressed as:

$$t^{(m)}=C^{(m)}r^{(m)}, m=1,\ldots,N_m,$$

where $N_m$ is the number of measurements taken. This assumes that the scene being imaged does not change during the entire sequence of these measurements (i.e., r remains constant). In some embodiments, the number of measurements $N_m$ may be at least the number of the EM detectors 120.

This linear transformation relation for each instance m can be represented using an aggregate coding matrix C, whose size is $N_i$ by $N_D$, where $N_D = N_d \times N_m$ is the number of detected values:

$$t=Cr,$$

where t is now a vector of length $N_D$. The vector r is still a vector of length $N_i$, which is assumed to remain constant throughout the procedure.

If the number of measurements $N_m$ is chosen sufficiently high, such that $N_D \geq N_i$, the aggregate coding matrix C (referred to sometimes herein simply as "coding matrix" C or "matrix" C) has a possibility of being the maximum rank of $N_i$ (i.e. "full-rank"). For practical purposes, the notion of rank should be replaced with "effective rank", defined as the number of singular values that exceed a certain threshold imposed by the accuracy of measurements and the noise floor in the EM detectors 120 (a mathematical definition of rank is the number of non-zero singular values).

In some embodiments, the controller 114 is programmed to determine C based, at least in part, on a coding matrix figure of merit of at least a portion of possible aggregate coding matrices C of the tunable coding aperture 130. By way of non-limiting example, the coding matrix figure of merit may include an effective rank (defined as a number of singular values of C that exceed a predetermined threshold value). In such instances, the desired aggregate coding matrix C may include of the portion of possible aggregate coding matrices that has a highest effective rank.

Also by way of non-limiting example, the coding matrix figure of merit may include a generalized determinant (defined as a product of singular values of C). In such instances, the desired aggregate coding matrix C may include one of the portion of possible aggregate coding matrices that has a highest generalized determinant.

As a further non-limiting example, the coding matrix figure of merit may include a minimum singular value. In such instances, the desired aggregate coding matrix C may be a matrix having a highest minimum singular value from among the at least a portion of possible aggregate coding matrices of the tunable coding aperture 130.

As a final non-limiting example, the coding matrix figure of merit may include a condition number. In such instances, the desired aggregate coding matrix C may include a matrix having a lowest condition number from among the at least a portion of possible aggregate coding matrices of the tunable coding aperture 130.

In some embodiments, it may be desirable to select the aggregate coding matrix C exhaustively from among all different possible coding matrices C. In such embodiments, the portion of possible aggregate coding matrices of the tunable coding aperture 132 may include all possible aggregate coding matrices C having a set number of aggregated coding matrices C. In some embodiments, the set number of aggregated coding matrices C within the aggregate coding matrices C may be greater than or equal to a number of the voxels 140 divided by a number of the EM detectors 120. In some embodiments, the portion of possible aggregate coding matrices C includes at least a portion of possible aggregated coding matrices C having a one more than a set number of aggregated coding matrices if it is determined that a matrix having a highest effective rank from among at least a portion of possible aggregate coding matrices having the set number of aggregated coding matrices is not full rank. In other words, if it is determined that C is not full rank, then another coding matrix C is added to the aggregate coding matrices C. If however, it is determined that C is full rank, the set number of coding matrices C in the aggregate coding matrix C may be used.

In some embodiments, the possible coding matrices C may be determined based on possible control parameter vectors CONTROLS that may be applied to the tunable inputs 134 of the tunable coding aperture 130. Accordingly, the aggregate coding matrix C may be made up of only the possible coding matrices C that correspond to the possible control parameter vector CONTROLS that can be applied to the tunable inputs 134.

When C is full-effective-rank in the sense defined above, reliable estimation of the unknown vector r can be accomplished. The matrix C, however, is not guaranteed to be full-effective-rank, unless the controller 114 is specifically designed (e.g., programmed) to ensure that matrix C has full-effective-rank. If the controller 114 does not have a sufficient control over the coding matrix, the only thing that can be done is to increase the number of measurements $N_m$ until the full-rank condition is achieved.

Increasing the number of measurements $N_m$, however, is undesirable because increasing the number of measurements $N_m$ increases the image acquisition time. For time-dependent scenes, increased image acquisition time presents a limitation for image quality. Rank-deficient conditions are especially likely to occur when any of the voxels 140, the receiving detectors 120, or the scattering elements 120 of the tunable coding aperture 130 are separated by deeply sub-wavelength distances (e.g., less than or equal to about half of an operational wavelength of the EM detectors 120). As a general rule in MIMO systems, which are mathematically analogous to sub-wavelength coded-aperture imaging systems, receiver spacing tighter than approximately a half-wavelength leads to rank-deficient channel matrices.

Sub-wavelength resolution is helpful for any long-wavelength imaging system, such as a heart failure (HF) imaging apparatus operating on a single-meter scale and requiring spatial resolution of order 1 cm or less. This is particularly important for medical imaging. Due to electromagnetic wave attenuation in tissues, frequencies at or below about 300 MHz are useful for efficient sensing deep inside a human body. The corresponding operational wavelength is about 10 meters and longer. Thus, the useful spatial resolution (such as 1 mm) corresponds to typically 1/10,000 of a the operational wavelength or less. Coded-aperture imaging based on the conventional "transmissive plate" concept is impractical due to the extremely sub-wavelength size of the pixels/voxels.

One complication inherent to sub-wavelength spacing of the EM scattering elements 132 is that a non-trivial degree of mutual coupling of EM fields at each of the EM scattering elements 132 on others of the EM scattering elements 132 occurs. As a result, the effect of the tunable coding aperture 130 on the field amplitudes t detected by the EM detectors and the linear transformation C should account for this mutual coupling. Computations that account for these mutual coupling and other effects may be relatively complex, and consume a relatively large amount of computing power. This complexity is further exacerbated when computing the aggregated coding matrix C because the computations that account for mutual coupling are performed for each of the $N_m$ different C matrices corresponding to each measurement taken.

One way to reduce the computational complication is to model the system 100 as including lumped ports, which enables the system to be separated into portions that change as the C matrix changes with adjustments to the tunable inputs 134, and to portions that do not change as the C matrix changes. An embodiment taking this approach is discussed in more detail herein with reference to FIG. 2.

Optimizing the tuning of the individual EM scattering elements 132 or groups of EM scattering elements 132 to attain a target C or C̃ may be done in a wide variety of manners. Many of these approaches, however, result in one or a small number of potential tuning solutions, without giving any assurance that any of these solutions represent the best solution (global optimum) and/or without providing any indication of how close to the global optimum the solution might be. Exhaustive computations using traditional methods may be too computationally intensive and/or infeasible for real-time tuning and for switching.

The complexity of the optimization problem may increase rapidly with the complexity of the device. In many embodiments, the complexity increases exponentially with the number of EM scattering elements 132. Thus, standard optimization approaches for tuning an array of EM scattering elements 130 may require cost functions to be evaluated a large number of times. The number of EM scattering elements 132 of the system 100 may be expressed as the degrees of freedom (DoF) of the system 100. The DoF may be based on the number of EM scattering elements 132, associated tunable elements, and/or other tunable or adjustable components associated with the system 100 (e.g., the EM detectors 120). As the DoF increases, the complexity is likely to increase exponentially, leading to optimization problems for which global or even quasi-global solutions are prohibitively computationally expensive for even moderate device complexity.

The systems and related methods disclosed herein provide optimization solutions for arrays of tunable EM scattering elements and associated tunable (i.e., variable) lumped impedance elements in which the optimization solutions are rational multivariate functions. Accordingly, globally optimal solutions may be found by solving optimization problems that scale linearly with the DoF instead of exponentially. The optimization approach can be simplified by making the cost function dependent on one matrix-value input (such as an impedance matrix, Z-Matrix) that can be calculated by performing no more than N linear system simulations. In the present application, N is an integer corresponding to the number of variable (e.g., tunable) impedance elements associated with a system.

The cost function, although still non-linear, may have a specific rational form that permits exhaustive enumeration of all local extrema. A global maximum (or minimum) can be selected from the local extrema. For rational function, the extrema are found by solving multivariate polynomial equations. Root enumeration and/or numerical calculations of the multivariate polynomial equations may allow for specialized treatment.

Tunable metamaterials, including two-dimensional metasurface devices, may comprise an array of unit cells. Each unit cell may be modeled as a sub-wavelength antenna element associated with one or more variable impedance elements (e.g., the EM scattering elements 132). Each variable impedance element may be associated with one or more EM scattering elements 132. Each impedance element or group of impedance elements may be variably controlled based on one or more impedance control inputs (i.e., CONTROLS). The tuning may be a dynamic process that occurs during operation by modifying one or more control inputs.

As an example of static tunability, a metamaterial coded aperture device may be manufactured using a 3D printer and the tuning may comprise selecting a material or combination of materials that results in a specific electromagnetic or electrical property for each of the impedance elements. By uniquely selecting the material or combination of materials for each of the unit cells, a metamaterial coded aperture device may be statically tuned to a specific coder, resulting in a specific C. Alternatively, each unit cell may be modeled to include a lumped impedance element with (at least) one input and (at least) one output. The input(s) may be dynamically manipulated during operation to dynamically tune the tunable coding aperture 130 in real-time to allow for a wide range of selectable C matrices or C matrices.

As previously described, the system 100 may be modeled to include lumped impedance elements corresponding to the EM scattering elements 132. These lumped impedance elements can be passive, active, or variably passive-active. At a given frequency, each impedance element may be fully described by the complex value of its impedance "z." A positive integer N may be used to describe the number of tunable or variable lumped impedance elements in a tunable coding aperture. A diagonal square matrix of size N may have diagonal elements $z_n$ representative of the nth elements of the coded aperture system. Alternatively, an N-dimensional complex vector, $\{z_n\}$, can be used to represent the n-valued list of impedance values.

Each variable impedance element may be modeled as a port (e.g., a lumped port and/or a wave port). A plurality of lumped ports, N, may include a plurality of internal lumped ports, $N_a$, internal to the tunable coding aperture 130 and with impedance values corresponding to the impedance values of each of the variable impedance elements, and at least one lumped external port (e.g., associated with the EM detectors 120 and the voxels 140), $N_e$, that may or may not have a variable impedance or any impedance at all. That is, the z value of some or all of the modeled lumped external port, $N_e$, may be zero and represent an idealized shorted port. Alternatively, the z value of some or all of the modeled lumped external ports, $N_e$, may be infinity and represent an idealized open port. In many embodiments, the z value of some or all of the external lumped ports, $N_e$, may be a complex value with a magnitude between zero and infinity.

Regardless of the impedance values of each of the lumped ports, N, including the internal lumped ports, $N_a$, and the at least one lumped external port, $N_e$, each of the lumped ports (or in some embodiments wave ports) may have its own self-impedance and the network of ports may be described by an N×N impedance matrix (Z-Matrix) or by the equivalent inverse admittance matrix (Y-matrix) where $Y=Z^{-1}$. Additionally, the network of ports can be modeled as an S-parameter matrix or scattering matrix (S-matrix). The Z-matrix and its inverse, the Y-matrix, are independent from the specific z values of the ports because the matrix elements are defined as $Z_{nm}=V_n/I_m$, where $V_n$ and $I_m$ are the voltage at port n and the current at port m, measured with all other ports open. That is, assuming port currents $I_k=0$ for all k are not equal to m or n. Similarly, for the admittance matrix, $Y_{nm}=I_m/V_n$, measured with all other ports open. Again, that is assuming port currents $I_k=0$ for all k are not equal to m or n.

The S-matrix is expressible through the Z or Y matrices and the values of the lumped impedance elements as follows:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}$$

In the equation above, the "1" represents a unit matrix of size N. The S-matrix models the port-to-port transmission of off-diagonal elements of the N-port antenna system. In a lossless system, the S-matrix is necessarily unitary. If elements $s_n$ are the singular values of the S-matrix, which are the same as the magnitudes of the eigenvalues, it can be stated that in a lossless system, all $s_n=1$. In general, if $s_{max}$ is the largest singular value, then for a passive lossy system it can be stated that $s_n \leq s_{max} \leq 1$.

In an active system, these bounds still hold; however, $s_{max}$ can now exceed unity, representing an overall power gain for at least one propagation path. The Z and Y matrices are diagonalized in the same basis represented by a unitary matrix U ($U^\dagger=U^{-1}$), such that $Z=U^\dagger Z_d U$, $Y=U^\dagger Y_d U$, where the subscript d indicates a diagonal matrix, the elements of which are complex-valued eigenvalues of the corresponding matrix.

Generally speaking, unless $\sqrt{z}$ is proportional to a unit matrix (i.e., all lumped element impedances are equal), the S-matrix will not be diagonal in the U-basis. In the U-basis, the general form of the S-matrix is $S=U^\dagger(1-\zeta Y_d\zeta)(1+\zeta Y_d\zeta)^{-1}U$, where a new non-diagonal matrix $\zeta=U\sqrt{z}U^\dagger$ is used such that $\sqrt{z}=U^\dagger\zeta U$, and $Y_d$ is diagonal, though not generally commutative with $\zeta$.

The S-matrix of the system can be numerically evaluated with any desired accuracy by solving exactly N linear system problems (e.g., $Z_{nm}=V_n/I_m$ or $Y_{nm}=I_m/V_n$ and the associated open port conditions described above). Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The Z-matrix and/or the Y-matrix can be evaluated based on a knowledge of the S-matrix and the impedance values. With many FEM solvers, it is also possible to directly evaluate the Z-matrix or the Y-matrix, by solving $N^2$ linear problems. This approach, however, is N times less efficient than calculating the S-matrix with a fixed set of port impedance values (known as reference impedance values) and transforming it to Z and/or Y.

In various embodiments, a tunable coded aperture sensing system (e.g., the system 100) may include a plurality of sub-wavelength scattering elements (e.g., the EM scattering elements 132). The sub-wavelength scattering elements may each have a maximum dimension that is less than or equal to about half of a wavelength of the smallest frequency within an operating frequency range of EM detectors (e.g., the EM detectors 120. One or more of the sub-wavelength scattering elements may comprise a resonating element. In various embodiments, some or all of the sub-wavelength scattering elements may comprise metamaterials. In other embodiments, an array of the sub-wavelength scattering elements (e.g., resonating elements) may be collectively considered a metamaterial.

The sub-wavelength scattering elements may have inter-element spacings that are substantially less than a free-space wavelength corresponding to an operating frequency or frequency range. For example, the inter-element spacings may be less than one-half or one-quarter of the free-space operating wavelength. The tunable coded aperture sensing system may be configured to operate in a wide variety of operating frequency ranges, including, but not limited to, microwave frequencies. The presently described systems and methods may be adapted for use with other frequency bands, including those designated as very low frequency, low frequency, medium frequency, high frequency, very high frequency, ultra-high frequency, super-high frequency, and extremely high frequency or millimeter waves.

In some embodiments, each of the sub-wavelength scattering elements is associated with at least one lumped impedance element. In some embodiments, a common transmission line (TL) may be coupled to the sub-wavelength scattering elements via the lumped impedance elements. Alternative waveguides may be used instead of or in addition to TLs. Each lumped impedance element may have a variable impedance value that may be at least partially based on the connected sub-wavelength scattering element(s) and/or a connected TL or other waveguide(s). A waveguide or TL may be modeled as another port in the S-matrix in some embodiments, such as in Heretic-like architectures with variable couplers.

The impedance of each of the lumped impedance elements may be variably adjusted through one or more impedance control inputs (e.g., the CONTROLS). The number of sub-wavelength scattering elements, associated impedance elements, and the number of impedance control inputs may be a 1:1:1 ratio or an X:Y:Z, where X, Y, and Z are integers that may or may not be equal. For instance, in one embodiment there may be a 1:1 mapping of impedance elements to sub-wavelength scattering elements while there is only one-tenth the number of impedance control inputs.

In various embodiments, the modeled lumped external port, $N_e$, may or may not be associated with a variable impedance element. In some embodiments, the lumped external port, $N_e$, is modeled as an external port with an infinitesimal volume located at a particular radius-vector relative to the EM detectors (e.g., the EM detectors 120). The lumped external port, $N_e$, may be in the far-field of the EM detectors, the radiative near-field of the EM detectors, or the reactive near-field of the EM detectors.

In some embodiments, the lumped external port, $N_e$, may comprise a virtual port, an external region of space assumed to be a void, a region of space assumed to be filled with a dielectric material, and/or a location in space assumed to be filled with a conductive, radiative, reactive, and/or reflective material. In at least some embodiments, the lumped external port, $N_e$, comprises an EM detector (e.g., the EM detectors 120, etc.), or a voxel (e.g., the voxels 140).

The lumped external port, $N_e$, may also be modeled as a virtual external port, comprises a field probe, as measured by a non-perturbing measurement. In other embodiments, the virtual external port may represent a numerical field probe, as calculated using a numerical simulation.

As previously described, in some embodiments, a unique lumped impedance element may be associated with each of the EM scattering elements 132. In other embodiments, a plurality of EM scattering elements 132 may be grouped together and associated with a single, variable, lumped impedance element. Conversely, a plurality of lumped impedance elements may be associated with a single sub-wavelength EM scattering element 132. In such an embodiment, the impedance of each of the plurality of lumped impedance elements may be controlled individually, or only some of them may be variable. In any of the above embodiments, X impedance control inputs may be varied to control the impedance of Y lumped impedance elements, where X and Y are integers that may or may not be equal to each other.

As a specific example, 1,000 unique impedance control inputs may be provided for each of 1,000 unique lumped impedance elements. In such an embodiment, each of the impedance control inputs may be varied to control the impedance of each of the lumped impedance elements. As an alternative example, 1,000 unique lumped impedance elements may be controlled to be variably addressed by a binary control system with 10 inputs.

In some embodiments, one or more of the impedance control inputs may utilize the application of a direct current (DC) voltage to variably control the impedance of the lumped impedance element based on the magnitude of the applied DC voltage. In other embodiments, an impedance control input may utilize one or more of an electrical current input, a radiofrequency electromagnetic wave input, an optical radiation input, a thermal radiation input, a terahertz radiation input, an acoustic wave input, a phonon wave input, a mechanical pressure input, a mechanical contact input, a thermal conduction input, an electromagnetic input, an electrical impedance control input, and a mechanical switch input. In various embodiments, the lumped impedance elements may be modeled as two-port structures with an input and an output.

The lumped impedance elements may comprise one or more of a resistor, a capacitor, an inductor, a varactor, a diode, a MEMS capacitor, a BST capacitor, a tunable ferroelectric capacitor, a tunable MEMS inductor, a pin diode, an adjustable resistor, an HEMT transistor, and/or another type of transistor. Any of a wide variety of alternative circuit components (whether in discrete or integrated form) may be part of a lumped impedance element.

One or more hardware, software, and/or firmware solutions may be employed to perform operations for coding (e.g., linear coding) by controlling the impedance values of the lumped impedance elements via the one or more impedance control inputs. For instance, a computer-readable medium (e.g., a non-transitory computer-readable medium such as, for example, the storage device 118) may have instructions that are executable by a processor (e.g., the processor 116) to form a specific coded aperture. The executed operations or method operations may include determining a scattering matrix (S-matrix) of field amplitudes for each of a plurality of lumped ports, N.

The lumped ports, N, may include a plurality of internal lumped ports, $N_a$, with impedance values corresponding to the impedance values of the plurality of physical impedance elements (e.g., the EM scattering elements 132). In at least some embodiments, the modeled lumped ports, N, include at least one external port, $N_e$, that is located physically external to the antenna system. In some embodiments, the lumped ports, N, also include a TL or other waveguide as another lumped port for the calculation of the S-matrix.

The S-matrix is expressible in terms of an impedance matrix, Z-matrix, with impedance values, $z_n$, of each of the plurality of lumped ports, N. Thus, by modifying one or more of the impedance values, $z_n$, associated with one or more of the plurality of lumped ports, N, a desired S-matrix of field amplitudes can be attained. The operations or method steps may include identifying a target coded aperture of the tunable coding aperture 130 defined in terms of target field amplitudes in the S-matrix for the at least one lumped external port, $N_e$.

An optimized port impedance vector $\{z_n\}$ of impedance values $z_n$ for each of the internal lumped ports, $N_a$, may be calculated that results in S-matrix elements for the one or more lumped external ports, $N_e$, that approximates the target coded aperture for a given operating frequency. Once an optimized $\{z_n\}$ is identified that will result in the desired field amplitude values for the S-matrix elements of the one or more lumped external ports, $N_e$, the variable impedance control inputs may be adjusted as necessary to attain the optimized $\{z_a\}$.

As an example, a target coded aperture may correspond to a diagonal portion of an S-matrix that relates electric fields at external lumped ports, $N_e$, corresponding to the EM detectors 120 to electric fields at external lumped ports, $N_e$, corresponding to the voxels 140. Any number of lumped external ports, $N_e$, may be used as part of the S-matrix calculation. Using a plurality of lumped external ports, $N_e$, may allow for the definition of a coded aperture relating multiple one or more EM detectors 120 to multiple voxels 140. Thus, the S-matrix may be calculated with a plurality of lumped external ports located external to the antenna device.

In various embodiments, at least one of the plurality of internal lumped ports, $N_a$, is strongly mutually coupled to at least one other internal lumped port, $N_a$. In some embodiments, at least one of the lumped external ports, $N_e$, is mutually coupled to one or more of the internal lumped ports, $N_a$. Strongly mutually coupled devices may be those in which an off-diagonal Z-matrix element, $Z_{ij}$, is greater in magnitude than one-tenth of the max ($|Z_{ii}|$, $|Z_{jj}|$).

Determining an optimized $\{z_n\}$ may include calculating an optimized Z-matrix using one or more of a variety of mathematical optimization techniques. For example, the optimized $\{z_n\}$ may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a Multistart algorithm, and/or a global search optimization algorithm. Determining the optimized $\{z_n\}$ may be at least partially based on one or more initial guesses. Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema.

For gradient-assisted optimization, a gradient may be calculated analytically using an equation relating an S-parameter of the S-matrix to the Z-matrix and the optimized $\{z_n\}$. In some embodiments, a Hessian matrix calculation may be utilized that is calculated analytically using the equation relating the S-parameter to the Z-matrix and the optimized $\{z_n\}$. A quasi-Newton method may also be employed in some embodiments. In the context of optimization, the Hessian matrix may be considered a matrix of second derivatives of the scalar optimization goal function with respect to the optimization variable vector.

In some embodiments, the global optimization method may include exhaustively or almost exhaustively determining all local extrema by solving a multivariate polynomial equation and selecting a global extrema from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables.

Exhaustively determining all local extrema may be performed by splitting the domain based on expected roots and then splitting it into smaller domains to calculate a single root or splitting the domain until a domain with a single root is found. Determining the optimized $\{z_n\}$ may include solving the optimization problem in which a simple case may include a clumped function scalar function with one output and N inputs. The N inputs could be complex $z_n$ values and the optimized Z-matrix may be calculated based on an optimization of complex impedance values of the $z_n$ vectors.

The optimized $\{z_n\}$ may be calculated by finding an optimized Z-matrix based on an optimization of complex impedance values $z_n$. The optimized $\{z_n\}$ may be calculated by finding an optimized Z-matrix based on an optimization of roots of complex values of the impedance values $z_n$. The optimized $\{z_n\}$ may be calculated by finding an optimized Z-matrix based on an optimization of reactances associated with the impedance values of the impedance values $z_n$. The optimized $\{z_n\}$ may be calculated by finding an optimized Z-matrix based on an optimization of resistivities associated with the impedance values of the impedance values $z_n$. The optimization may be constrained to allow only positive or inductive values of reactances, or only negative or capacitive values of reactances. In other embodiments, the optimization of resistivities may be constrained to only allow for positive or passive values of resistivities.

The optimized $\{z_n\}$ may be calculated by finding an optimized Z-matrix based on an optimization of the impedance control inputs (e.g., CONTROLS) associated with the lumped impedance elements of each of the EM scattering elements 132. The optimized $\{z_n\}$ may be calculated by optimizing a non-linear function. The non-linear function may relate impedance values for each of the internal lumped ports, $N_a$, as modeled in the S-matrix and the associated impedance control inputs. In some embodiments, the non-linear function may be fitted to a lower-order polynomial for optimization.

Mapping the Z-matrix values to the S-matrix values may include a non-linear mapping. In some instances, the mapping may be expressible as a single or multivariate polynomial. The polynomial may be of a relatively low order (e.g., 1-5). The S-matrix may comprise N values and the Z-matrix may comprise M values, where N and M are both integers and equal to one another, such that there is a 1:1 mapping of S-matrix values and Z-matrix values. Any of a wide variety of mappings are possible. For example, the S-matrix may comprise N values and the Z-matrix may comprise M values, where N squared is equal to M. Alternatively, there may be a 2:1 or 3:1 mapping or a 1:3 or 2:1 mapping.

The physical location of the at least one lumped external port, $N_e$, may be associated with a single-path or multipath propagation channel that is electromagnetically reflective and/or refractive. The multipath propagation channel may be in the near-field. In a radiative near-field, the multipath propagation pattern may be in the reactive near-field.

As previously described, the field amplitudes in the S-matrix may be used to define a coded aperture. In some embodiments, the target coded aperture may be defined in terms of a target field amplitude for a single linear field polarization. The target coded aperture may be defined in terms of a plurality of field amplitudes for a plurality of lumped external ports, $N_e$. The target coded aperture may be defined in terms of a target field amplitude for at least two linear polarizations.

Determining the optimized $\{z_n\}$ of impedance values for each of the internal lumped ports, $N_a$ (e.g., the EM scattering elements 132), may include determining an optimized set of control values for the plurality of impedance control inputs (e.g., the tunable inputs 134) that results in an aggregate coding matrix C based at least in part, on a coding matrix figure of merit (e.g., an effective rank, a generalized determinant, a minimum singular value, a condition number, etc.).

In conformity with the coded aperture systems and associated methods described above, a plurality of internal lumped ports, $N_a$, with impedance values corresponding to the impedance values of each of the plurality of lumped impedance elements may be considered jointly with one or more external ports, $N_e$, whose purpose is to account for the field intensity at a particular location exterior to the tunable coding aperture 130. The external port, $N_e$, may represent an actual EM detector or voxel (e.g., the EM detectors 120 or the voxels 140), in which case a known input impedance of that port may be assigned to the external port, $N_e$. In other embodiments, the one or more external ports, $N_e$, may be merely conceptual and used to quantify one or more field intensities at one or more locations (e.g., for voxels 140 corresponding to points in free space). The external port, $N_e$, may be assumed infinitesimal in area and/or volume and located at a particular radius-vector $\vec{r}_0$.

Regardless of the number of external ports, $N_e$, the total number of ports, N, will correspond to the number of internal lumped ports, $N_a$, and the number of external ports, $N_e$. In some embodiments, a common port (e.g., a waveguide or TL) associated with the antenna system may also be considered. In any such embodiments, the total size of the system matrices will be generally of size N, which does not grow exponentially with the degrees of freedom or number of variable impedance elements.

The S-matrix element $S_{1N}$ represents the complex magnitude of field (e.g., electric field) at a particular location in space, given by the radius vector $\vec{r}_0$, normalized to the field magnitude at the input port. The absolute value $|S_{1N}|$, or the more algebraically convenient quantity $|S_{1N}|^2$, quantifies the quality of field concentration at that point. Maximizing this quantity (or minimizing in the case of forming nulls) represents a generalized beamforming algorithm.

In some embodiments, the location $\vec{r}_0$ is in the far-field of the rest of the system, and the algorithm yields directive beams of the EM detectors 120 in the far-field. In other embodiments, the point $\vec{r}_0$ is in the radiative near-field of the rest of the system, and the algorithm yields field focusing to that point. In still other embodiments, the point $\vec{r}_0$ is within the reactive near-field of at least one part of the rest of the system, and the algorithm maximizes electric field intensity and electric energy density at that point.

To find all local optima and the global optimum we can use the equation $q_n \equiv \sqrt{z_n}$, which characterizes the individual port impedances $z_n$. The equation above, $S = U^\dagger(1 - \zeta Y_d \zeta)(1 + fY_d \zeta)^{-1} U$, is a rational (and meromorphic) analytical function of $\{q_n\}$.

To make this function bounded, and find its maxima that are attainable in a passive system, the function may be restricted to the multidimensional segment satisfying $Re(z_n) \geq 0$, $n = 1, \ldots, N$. Equivalently, this condition is $-\pi/2 \leq \arg z_n \leq \pi/2$, and consequently $-\pi/4$ arg $q_n \leq \pi/4$.

To reduce this problem to real values, each $q_n$ variable can be expressed through real variables, $q_n = \rho_n + i\xi_n$. In this manner, the real valued function $|S_{1N}|^2$ is now a function of 2N real variables $\rho_n$, $\xi_n$, which is a rational function comprising a ratio of two 2N-variate polynomials.

In some embodiments, the resistance of each lumped element can be neglected by assuming $Re(z_n) = 0$, $z_n = ix_n$, with the real reactance values $x_n$. In such embodiments, the system as a whole is still assumed passive and lossy with the losses occurring on the paths between the ports and incorporated into the Z-matrix (or Y-matrix). This approximation satisfies the passivity constraints and also reduces the number of variables to N because $\sqrt{z}Y\sqrt{z} \to i\sqrt{x}Y\sqrt{x}$, and x is purely real.

The function $|S_{1N}|^2$ is necessarily bounded for a passive system, and therefore it has a finite global maximum as a function of real-valued variables $\rho_n, \xi_n$. Moreover, it has a finite number of local extrema. These extrema can be found by solving a set of 2N multivariate polynomial equations given by the standard zero gradient condition at the extremum:

$$\frac{\partial |S_{1N}|^2}{\partial \rho_n} = 0, \frac{\partial |S_{1N}|^2}{\partial \xi_n} = 0, n = 1, \ldots, N.$$

In the simplified approach above, there are N unknowns $\chi_n = \sqrt{x_n}$ and N extremum conditions, so $$\frac{\partial |S_{1N}|^2}{\partial \chi_n} = 0, n = 1, \ldots, N.$$

Once these extrema are found, the extremal values of the function are evaluated numerically, and the global maximum is determined by choosing the largest local maximum. A similar approach can be performed to identify one or more minimums to attain a target radiation pattern with a null at one or more specific radius vectors $\vec{r}_0$.

Numerical and symbolic-manipulation algorithms exist that take advantage of the polynomial nature of the resulting equations. For example, Wolfram Mathematica™ function Maximize supports symbolic solving of the global optimization problem for multivariate polynomial equations, unconstrained or with multivariate polynomial constraints. This function is based on a Groebner-basis calculation algorithm, which reduces the multidimensional polynomial system to a triangular system, which is then reduced to a single scalar polynomial equation by back-substitution. Similar functionality exists in other software packages, including MATLAB™ with Symbolic Math Toolbox™, Maple™ and so on.

As previously discussed, once values are determined for each of the $z_n$ for the variable or tunable lumped impedance elements associated with the EM scattering elements 132, each of the EM scattering elements 132 can be tuned. In some embodiments, the tuning is static and the impedance values are set at the manufacturing stage. In other embodiments, a physical stimulus (e.g., mechanical, electric, electromagnetic, and/or a combination thereof) may be used to dynamically tune the EM scattering elements 132 to dynamically modify the tunable coding aperture 130 during operation.

Depending on the manufacturing techniques employed (e.g., 3D printing) the calculated values of optimum impedance values may translate trivially into the choices made for the selectable impedance elements. In contrast, for the dynamically adjustable, variable, or tunable impedance elements, there is generally a non-trivial relationship between the complex impedance of the elements and the stimuli that control them. In some embodiments, the relationship between the complex impedance of the impedance elements and the control inputs may be based on a magnitude of an applied signal. Appreciating that the magnitude of the stimulus may be binary in some embodiments (i.e., on or off), the relationship may be modeled as $z_n = f_n(s_n)$, where $s_n$ is the real-valued magnitude of the stimulus. The function $f_n(s_n)$ can be fitted with a polynomial order S, and substituted into $|S_{1N}|^2$. The functions $f_n$ can be all the same when identical dynamically tunable elements are used, in which case there will be N extremum conditions for N real variables $s_n$, each of which is still a rational function.

In the lowest-order approximation, the fitting polynomial can be linear (S=1), in which case the complexity of the extremum problem is still $$\frac{\partial |S_{1N}|^2}{\partial \chi_n} = 0, n = 1, \ldots, N.$$

The quality of a polynomial approximation depends greatly on the practically available range of the stimulus, or the range chosen for other practical considerations. Because the $s_n$ variables are restricted to a finite interval, the optimization problem can be solved with the corresponding constraints. When the optimization problem is solved by exhaustive enumeration of the extrema, these constrains are applied trivially and the local extrema not satisfying the constraints are excluded from the enumeration.

A wide range of coding applications are contemplated and made possible using the systems and methods described herein. For example, the lumped impedance element approach may be used to implement the coded aperture sensing systems 100, 200, other antenna systems discussed herein, and the method 300 discussed below. In some embodiments, beamforming may include a multipath propagation channel involving one or more reflective, refractive, or generally scattering object. In many embodiments, the relevant properties of the multipath propagation channel are incorporated into the Z-matrix. Numerical simulations that lead to a calculation of the Z-matrix may include a model of such a channel. A model of the multipath propagation channel can be simulated using any of a wide variety of simulation software packages, including, for example, ANSYS HFSS, COMSOL RF, CST MWS, etc.

In some embodiments, a particular linear field polarization can be achieved by considering the output port to be a port susceptible to only one linear polarization. For instance, a lumped (electrically small, single-mode) port is susceptible to a linear polarization with the electric field directed across the gap of the port.

In some embodiments, a target radiation pattern may be identified that includes a combination of two linear polarizations, including without limitation a circular polarization, that can be achieved by considering two co-located output ports, each of which is susceptible to only one linear polarization. In such an embodiment, the system matrices may be slightly increased by the addition of more external ports, $N_e$, but the addition of a few external ports increases the complexity by a relatively small constant value and will not change the general course of the algorithms and methods described herein.

In some embodiments, multiple beams can be formed simultaneously (the process known as multi-beam forming) by considering M output ports located in different directions with respect to the rest of the system. The size of the system matrices may then correspond to N=Na+M+1, which does not change the general course of the algorithm and does not exponentially increase the complexity.

As previously discussed, approximate nulls of the field can be formed, either in the far-field or near-field, by considering a minimization problem for the rational function of the equations above. Similarly, a required level of sidelobe suppression for a target radiation pattern can be attained by maximizing the function $F=|S_{1N}|^2-\alpha|S_{1N+1}|^2$, where the $N^{th}$ port measures the field intensity in one direction, the $(N+1)^{th}$ port measures field intensity in a specified sidelobe direction, and $\alpha$ is a selectable weight coefficient reflecting the degree to which sidelobe suppression should be achieved. It is appreciated that the equation above can be readily generalized to include any number of sidelobes in any number of directions. Thus, it is appreciated that instead of optimizing the impedance values themselves, a function relating the impedance control inputs to the impedance values of the variable (i.e., tunable) impedance elements may be substituted into the equations to allow for the direct optimization of the impedance control inputs.

Figure 2:
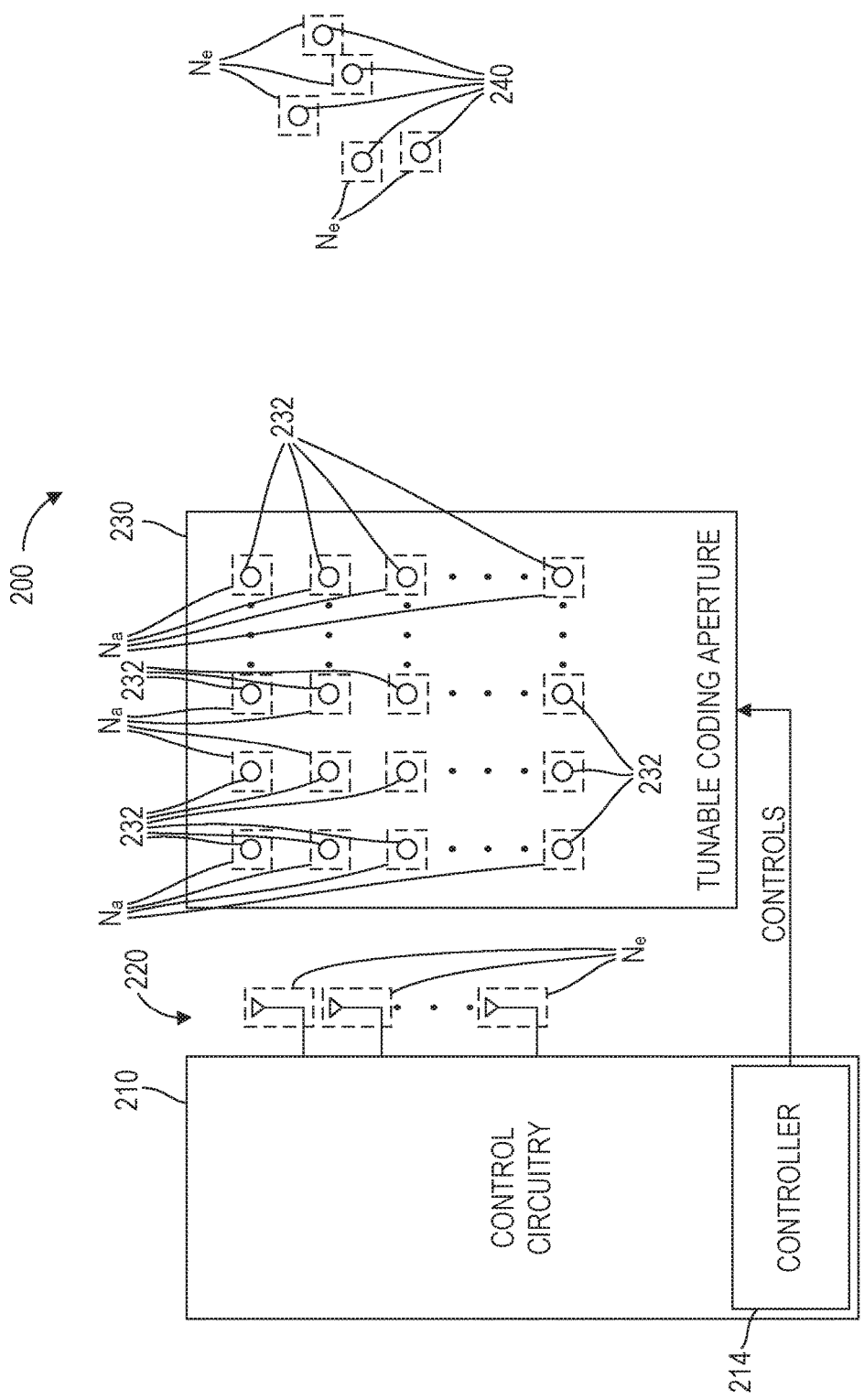
FIG. 2 is a simplified block diagram of a coded aperture sensing system, according to some embodiments.

FIG. 2 is a simplified block diagram of a coded aperture sensing system 200, according to some embodiments. The coded aperture sensing system 200 (sometimes referred to herein as "system" 200) includes control circuitry 210, EM detectors 220, a tunable coding aperture 230, and voxels 240, similar to the control circuitry 110, the EM detectors 120, the tunable coding aperture 130, and the voxels 140 of the system 100 of FIG. 1. For example, the control circuitry 210 includes a controller 214 similar to the controller 114 of FIG. 1, and the tunable coding aperture 230 includes EM scattering elements 232 similar to the EM scattering elements 132 of FIG. 1. The system 200 may also include other components of the system 100 of FIG. 1 that are not illustrated in FIG. 2 for simplicity.

The controller 214 is programmed to model various components of the system 200 as lumped ports $N_a$, $N_e$. By way of non-limiting example, the controller 214 may be programmed to model the EM detectors 220 and the voxels 240 as external lumped ports $N_e$ and the EM scattering elements 232 as internal lumped ports $N_a$ (e.g., lumped impedance elements). The controller 214 is programmed to determine possible scattering matrices (S-matrices) relating field amplitudes at the lumped ports $N_a$, $N_e$ for at least a portion of possible control parameter vectors CONTROLS. The controller 214 is further configured to determine possible aggregate coding matrices C, as discussed above, using the possible S-matrices.

By way of non-limiting example, the controller 214 may be programmed to determine the possible S-matrices as functions of an impedance matrix (Z-matrix) and a y-vector. The Z-matrix includes impedance values relating voltage potentials at each of the lumped ports $N_a$, $N_e$ to currents at each of the lumped ports $N_a$, $N_e$ with all others of the lumped ports $N_a$, $N_e$ open at an operational frequency of the EM detectors 220. The y-vector is a diagonal matrix including admittance values of the lumped ports $N_a$, $N_e$.

Also by way of non-limiting example, the controller 214 may be programmed to determine the possible S-matrices as functions of an admittance matrix (Y-matrix) and a z-vector. The Y-matrix includes admittance values relating voltage potentials at each of the lumped ports $N_a$, $N_e$ to currents at each of the lumped ports $N_a$, $N_e$ with all others of the lumped ports $N_a$, $N_e$ open at an operational frequency of the EM detectors 220. The z-vector is a diagonal matrix including impedance values of the lumped ports $N_a$, $N_e$.

With the possible S-matrices separated into their static portions (Z-matrices or Y-matrices) and dynamic portions (y-vectors or z-vectors), the possible C matrices may be determined without re-computing the static portions (Z-matrices or Y-matrices) for each permutation of possible control parameter vectors. As a result, computing resources may be reduced as compared to conventional imaging systems. Also, it may be possible to implement the system 200 in real-time or quasi real-time because the computing time is reduced. Even mutual coupling effects may be taken into consideration in the computations without unnecessarily complicating the computations, as at least a portion of the mutual coupling effects may be accounted for in the static portions (Z-matrices or Y-matrices) of the S-matrices.

Figure 3:
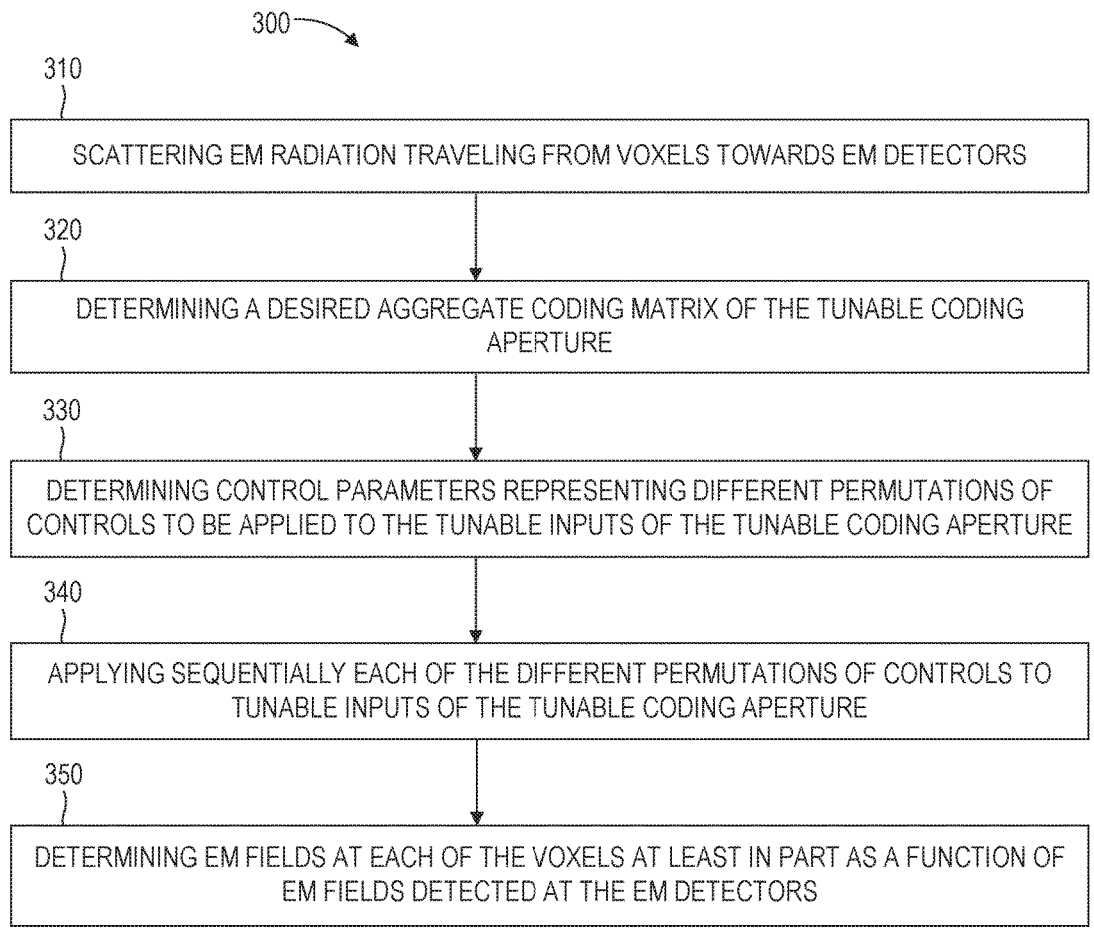
FIG. 3 is a simplified flowchart illustrating a method of operating a coded aperture sensing system, according to some embodiments.

FIG. 3 is a simplified flowchart illustrating a method 300 of operating a coded aperture sensing system 100, 200, according to some embodiments. Referring to FIGS. 1-3 together, the method 300 includes scattering 310 EM radiation traveling from a plurality of voxels 140, 240 towards one or more EM detectors 120, 220 with a tunable coding aperture 130, 230.

The method 300 also includes determining 320 a desired aggregate coding matrix C including an aggregation of different desired coding matrices C of the tunable coding aperture 130, 230. In some embodiments, determining 320 the desired aggregate coding matrix C includes determining the desired aggregate coding matrix C based, at least in part, on a coding matrix figure of merit of at least a portion of possible aggregate coding matrices C of the tunable coding aperture 130, 230. By way of non-limiting example, the coding matrix figure of merit may include an effective rank, a generalized determinant, a minimum singular value, a condition number, or a combination thereof. In some embodiments, determining 320 a desired aggregate coding matrix C includes modeling the tunable coding aperture 130, 230 to include lumped impedance elements corresponding to the EM scattering elements 132, 232. In such embodiments, the tunable inputs 134 may be configured to enable selection of an impedance value for some or all of the lumped impedance elements (e.g., individually, in groups, etc.). In some embodiments, modeling the tunable coding aperture 130, 230 includes the method 400 of FIG. 4.

The method 300 further includes determining 330 control parameter vectors representing different permutations of controls to be applied to the tunable inputs 134 of the tunable coding aperture. The control parameter vectors are selected to cause the coding matrix C of the tunable coding aperture to adjust at least approximately to a different one of the plurality of desired coding matrices C when applied to the tunable inputs 134 of the tunable coding aperture 130, 230. The method 300 also includes applying 340 sequentially each of the different permutations of controls represented by the different control parameter vectors to the tunable inputs 134 of the tunable coding aperture 130, 230.

The method 300 further includes determining 350 EM fields r at each of the voxels 140, 240 at least in part as a function of EM fields t detected at the EM detectors 120, 220 responsive to each of the different permutations of controls being applied to the tunable inputs 134 of the tunable coding aperture 130, 230.

Figure 4:
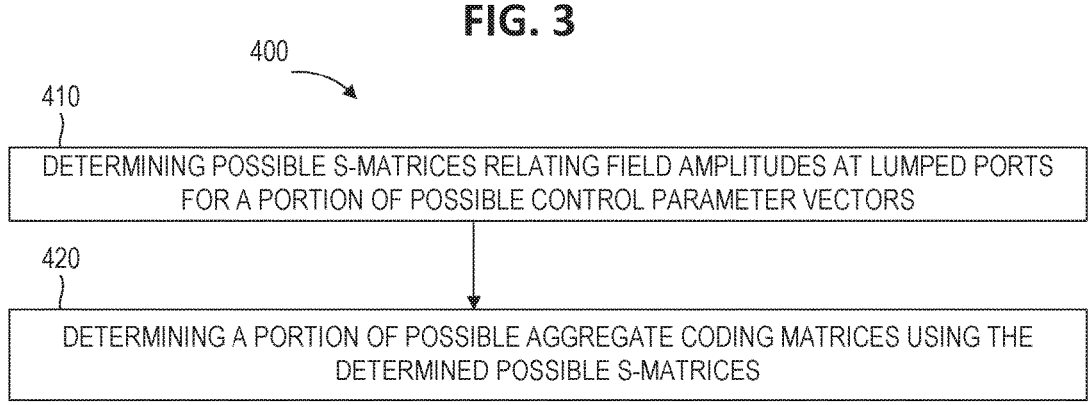
FIG. 4 is a simplified flowchart illustrating a method of modeling a tunable coding aperture according to some embodiments.

FIG. 4 is a simplified flowchart illustrating a method 400 of modeling the tunable coding aperture 130, 230, according to some embodiments. Referring to FIGS. 1, 2, and 4 together, the method 400 includes determining 410 possible S-matrices relating field amplitudes at lumped ports $N_a$, $N_e$ for at least a portion of possible control parameter vectors to be applied to the tunable inputs 134.

The method 400 also includes determining 420 a portion of possible aggregate coding matrices C using the determined possible S-matrices. In some embodiments, determining possible S-matrices includes determining the possible S-matrices as functions of an impedance matrix (Z-matrix) and an admittance vector (y-vector), as discussed above with reference to FIG. 2. In some embodiments, determining possible S-matrices includes determining the possible S-matrices as functions of an admittance matrix (Y-matrix) and an impedance vector (z-vector), as also discussed above with reference to FIG. 2.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A coded aperture sensing system, comprising:
one or more electromagnetic (EM) detectors;
a tunable coding aperture positioned relative to the one or more EM detectors and a plurality of voxels to scatter EM radiation traveling from the plurality of voxels towards the one or more EM detectors, the tunable coding aperture comprising:
EM scattering elements spaced at less than or equal to half wavelength intervals, wherein the half wavelength intervals are half of an operational wavelength of the EM detectors; and
tunable inputs operably coupled to the EM scattering elements and configured to adjust a coding matrix of the tunable coding aperture responsive to adjustments of controls applied to the tunable inputs; and
control circuitry comprising a controller operably coupled to the tunable inputs, the controller programmed to:
determine a desired aggregate coding matrix comprising an aggregation of a plurality of different desired coding matrices of the tunable coding aperture;
determine a plurality of different control parameter vectors representing a plurality of different permutations of controls to be applied to the tunable inputs of the tunable coding aperture that will cause the coding matrix of the tunable coding aperture to adjust at least approximately to a different one of the plurality of desired coding matrices when applied to the tunable inputs of the tunable coding aperture;
apply sequentially each of the plurality of different permutations of controls represented by the plurality of different control parameter vectors to the tunable inputs of the tunable coding aperture; and
determine EM fields at each of the plurality of voxels at least in part as a function of EM fields detected at the one or more EM detectors responsive to each of the plurality of different permutations of controls being applied to the tunable inputs of the tunable coding aperture.

2. The coded aperture sensing system of claim 1, wherein the plurality of voxels includes locations in space for which it is desired to infer amplitudes of the EM fields.

3. The coded aperture sensing system of claim 1, wherein the plurality of voxels includes a plurality of pixels comprising locations in a two-dimensional manifold in space.

4. The coded aperture sensing system of claim 1, wherein at least a portion of the plurality of voxels includes locations in space on or in one or more objects that it is desired to image.

5. The coded aperture sensing system of claim 1, wherein the control circuitry is programmed to determine the desired aggregate coding matrix based, at least in part, on a coding matrix figure of merit of at least a portion of possible aggregate coding matrices of the tunable coding aperture.

6. The coded aperture sensing system of claim 5, wherein the coding-matrix figure of merit includes an effective rank, the effective rank defined as a number of singular values of a matrix that exceed a predetermined threshold, wherein the desired aggregate coding matrix comprises one of the portion of possible aggregate coding matrices that has a highest effective rank.

7. The coded aperture sensing system of claim 5, wherein the coding-matrix figure of merit includes a generalized determinant, the generalized determinant defined as a product of singular values of a matrix, wherein desired aggregate coding matrix comprising one of the portion of possible aggregate coding matrices that has a highest generalized determinant.

8. The coded aperture sensing system of claim 5, wherein the coding-matrix figure of merit includes a minimum singular value, wherein the control circuitry is programmed to determine the desired aggregate coding matrix by selecting the desired aggregate coding matrix to be a matrix having a highest minimum singular value from among the at least a portion of possible aggregate coding matrices of the tunable coding aperture.

9. The coded aperture sensing system of claim 5, wherein the coding-matrix figure of merit includes a condition number, wherein the control circuitry is programmed to determine the desired aggregate coding matrix by selecting the desired aggregate coding matrix to be a matrix having a lowest condition number from among the at least a portion of possible aggregate coding matrices of the tunable coding aperture.

10. The coded aperture sensing system of claim 5, wherein the at least a portion of possible aggregate coding matrices of the tunable coding aperture includes at least a portion of possible aggregate coding matrices having a number N of aggregated coding matrices each.

11. The coded aperture sensing system of claim 10, wherein the at least a portion of possible aggregate coding matrices having a number N of aggregated coding matrices includes all possible aggregate coding matrices of the tunable coded aperture having the number N of aggregated coding matrices.

12. The coded aperture sensing system of claim 10, wherein the controller is programmed to select the number N to be a lowest integer that is greater than or equal to a number of the plurality of voxels divided by a number of the one or more EM detectors.

13. The coded aperture sensing system of claim 5, wherein the at least a portion of possible aggregate coding matrices of the tunable coding aperture includes at least a portion of possible aggregate coding matrices having a number N+1 of aggregated coding matrices if it is determined that a matrix having a highest effective rank from among at least a portion of possible aggregate coding matrices having a number N of aggregated coding matrices is not full rank.

14. The coded aperture sensing system of claim 13, wherein the at least a portion of possible aggregate coding matrices of the tunable coding aperture includes at least a portion of possible aggregate coding matrices having the number N of aggregated coding matrices if it is determined that the matrix having the highest effective rank from among the at least a portion of possible aggregate coding matrices having the number N of aggregated coding matrices is a full rank matrix.

15. The coded aperture sensing system of claim 5, wherein the controller is programmed to determine the at least a portion of possible aggregate coding matrices as a function of at least a portion of possible control parameter vectors of the plurality of different control parameter vectors.

16. The coded aperture sensing system of claim 5, wherein the controller is programmed to determine the at least a portion of possible aggregate coding matrices by modeling the tunable coding aperture to include lumped impedance elements corresponding to the EM scattering elements, the tunable inputs configured to enable selection of an impedance value for each of the lumped impedance elements.

17. The coded aperture sensing system of claim 16, wherein the controller is programmed to:
  determine possible scattering matrices (S-matrices) relating field amplitudes at lumped ports for at least a portion of possible control parameter vectors, the lumped ports including:
    internal lumped ports located internally to the tunable coding aperture, each of the internal lumped ports corresponding to a different one of the lumped impedance elements of the tunable coding aperture; and
    external lumped ports located externally to the tunable coding aperture, each of the external lumped ports corresponding to a different one of the plurality of voxels or the one or more EM detectors; and
  determine the at least a portion of possible aggregate coding matrices using the determined possible S-matrices.

18. The coded aperture sensing system of claim 17, wherein the controller is programmed to determine the possible S-matrices as functions of an impedance matrix (Z-matrix) and an admittance vector (y-vector), wherein the Z-matrix includes impedance values relating voltage potentials at each of the lumped ports to currents at each of the lumped ports with all others of the lumped ports open at an operational frequency of the EM detectors, and the y-vector is a diagonal matrix including admittance values of the lumped ports.

19. The coded aperture sensing system of claim 17, wherein the controller is programmed to determine the possible S-matrices as functions of an admittance matrix (Y-matrix) and an impedance vector (z-vector), wherein the Y-matrix includes admittance values relating voltage potentials at each of the lumped ports to currents at each of the lumped ports with all others of the lumped ports open at an operational frequency of the EM detectors and the z-vector is a diagonal matrix including impedance values of the lumped ports.

20. The coded aperture sensing system of claim 1, wherein a number of the one or more EM detectors is exactly one.

21. The coded aperture sensing system of claim 1, wherein a number N of aggregated coding matrices of the desired aggregate coding matrix is at least a number of the one or more EM detectors.

22. A method of operating a coded aperture sensing system, the method comprising:
  scattering electromagnetic (EM) radiation traveling from a plurality of voxels towards one or more EM detectors with a tunable coding aperture including EM scattering elements spaced at less than or equal to half wavelength intervals;
  determining a desired aggregate coding matrix comprising an aggregation of a plurality of different desired coding matrices of the tunable coding aperture;
  determining a plurality of different control parameter vectors representing a plurality of different permutations of controls to be applied to tunable inputs of the tunable coding aperture that will cause the coding matrix of the tunable coding aperture to adjust at least approximately to a different one of the plurality of desired coding matrices when applied to the tunable inputs of the tunable coding aperture;
  applying sequentially each of the plurality of different permutations of controls represented by the plurality of different control parameter vectors to the tunable inputs of the tunable coding aperture; and
  determining EM fields at each of the plurality of voxels at least in part as a function of EM fields detected at the one or more EM detectors responsive to each of the plurality of different permutations of controls being applied to the tunable inputs of the tunable coding aperture.

23. The method of claim 22, wherein scattering EM radiation traveling from a plurality of voxels towards one or more EM detectors with a tunable coding aperture includes scattering the EM radiation traveling from locations in space for which it is desired to infer amplitudes of the EM fields.

24. The method of claim 22, wherein scattering EM radiation traveling from a plurality of voxels towards one or more EM detectors with a tunable coding aperture includes scattering the EM radiation traveling from locations in a two-dimensional manifold in space.

25. The method of claim 22, wherein scattering EM radiation traveling from a plurality of voxels towards one or more EM detectors with a tunable coding aperture includes scattering the EM radiation traveling from locations in space on or in one or more objects that it is desired to image.

26. The method of claim 22, wherein determining a desired aggregate coding matrix includes determining the desired aggregate coding matrix based, at least in part, on a coding matrix figure of merit of at least a portion of possible aggregate coding matrices of the tunable coding aperture.

27. The method of claim 26, wherein determining the desired aggregate coding matrix based, at least in part, on a coding matrix figure of merit includes determining the desired aggregate coding matrix based, at least in part, on an effective rank of the at least a portion of possible aggregate coding matrices of the tunable coding aperture, the effective rank defined as a number of singular values of a matrix that exceed a predetermined threshold, wherein the desired aggregate coding matrix comprises one of the portion of possible aggregate coding matrices that has a highest effective rank.

28. The method of claim 26, wherein determining the desired aggregate coding matrix based, at least in part, on a coding matrix figure of merit includes determining the desired aggregate coding matrix based, at least in part, on a generalized determinant of the at least a portion of possible aggregate coding matrices of the tunable coding aperture, the generalized determinant defined as a product of singular values of a matrix, wherein the desired aggregate coding matrix comprises one of the portion of possible aggregate coding matrices that has a highest generalized determinant.

29. The method of claim 26, wherein determining the desired aggregate coding matrix based, at least in part, on a coding matrix figure of merit includes determining the desired aggregate coding matrix based, at least in part on a minimum singular value of the at least a portion of possible aggregate coding matrices of the tunable coding aperture, wherein determining the desired aggregate coding matrix includes selecting the desired aggregate coding matrix to be a matrix having a highest minimum singular value from among the at least a portion of possible aggregate coding matrices of the tunable coding aperture.

30. The method of claim 26, wherein determining the desired aggregate coding matrix based, at least in part, on a coding matrix figure of merit includes determining the desired aggregate coding matrix based, at least in part on a condition number of the at least a portion of possible aggregate coding matrices of the tunable coding aperture, wherein determining the desired aggregate coding matrix includes selecting the desired aggregate coding matrix to be a matrix having a lowest condition number from among the at least a portion of possible aggregate coding matrices of the tunable coding aperture.

31. The method of claim 26, wherein determining the desired aggregate coding matrix includes determining the desired aggregate coding matrix of the at least a portion of possible aggregate coding matrices of the tunable coding aperture including at least a portion of possible aggregate coding matrices having a number N of aggregated coding matrices each.

32. The method of claim 31, wherein the at least a portion of possible aggregate coding matrices having a number N of aggregated coding matrices includes all possible aggregate coding matrices of the tunable coded aperture having the number N of aggregated coding matrices.

33. The method of claim 31, further comprising selecting the number N to be a lowest integer that is greater than or equal to a number of the plurality of voxels divided by a number of the one or more EM detectors.

34. The method of claim 26, wherein determining the desired aggregate coding matrix includes determining the at least a portion of possible aggregate coding matrices of the tunable coding aperture to include at least a portion of possible aggregate coding matrices having a number N+1 of aggregated coding matrices if it is determined that a matrix having a highest effective rank from among at least a portion of possible aggregate coding matrices having a number N of aggregated coding matrices is not full rank.

35. The method of claim 34, further comprising determining the at least a portion of possible aggregate coding matrices of the tunable coding aperture to include at least a portion of possible aggregate coding matrices having the number N of aggregated coding matrices if it is determined that the matrix having the highest effective rank from among the at least a portion of possible aggregate coding matrices having the number N of aggregated coding matrices is a full rank matrix.

36. The method of claim 26, wherein determining the desired aggregate coding matrix includes determining the at least a portion of possible aggregate coding matrices as a function of at least a portion of possible control parameter vectors of the plurality of different control parameter vectors.

37. The method of claim 26, wherein determining the desired aggregate coding matrix includes modeling the tunable coding aperture to include lumped impedance elements corresponding to the EM scattering elements, the tunable inputs configured to enable selection of an impedance value for each of the lumped impedance elements.

38. The method of claim 37, further comprising:
determining possible scattering matrices (S-matrices) relating field amplitudes at lumped ports for at least a portion of possible control parameter vectors, the lumped ports including:
internal lumped ports located internally to the tunable coding aperture, each of the internal lumped ports corresponding to a different one of the lumped impedance elements of the tunable coding aperture; and
external lumped ports located externally to the tunable coding aperture, each of the external lumped ports corresponding to a different one of the plurality of voxels or the one or more EM detectors; and
determining the at least a portion of possible aggregate coding matrices using the determined possible S-matrices.

39. The method of claim 38, wherein determining possible S-matrices includes determining the possible S-matrices as functions of an impedance matrix (Z-matrix) and an admittance vector (y-vector), wherein the Z-matrix includes impedance values relating voltage potentials at each of the lumped ports to currents at each of the lumped ports with all others of the lumped ports open at an operational frequency of the EM detectors, and the y-vector is a diagonal matrix including admittance values of the lumped ports.

40. The method of claim 38, wherein determining possible S-matrices includes determining the possible S-matrices as functions of an admittance matrix (Y-matrix) and an impedance vector (z-vector), wherein the Y-matrix includes admittance values relating voltage potentials at each of the lumped ports to currents at each of the lumped ports with all others of the lumped ports open at an operational frequency of the EM detectors and the z-vector is a diagonal matrix including impedance values of the lumped ports.

41. The method of claim 22, wherein scattering EM radiation traveling from a plurality of voxels towards one or more EM detectors includes scattering the EM radiation towards a number of the one or more EM detectors that is exactly one.

42. The method of claim 22, wherein determining a desired aggregate coding matrix comprising an aggregation of a plurality of different desired coding matrices of the tunable coding aperture includes determining the desired aggregate coding matrix to include a number N of the different desired coding matrices that is at least a number of the one or more EM detectors.

* * * * *